(12) United States Patent
Jiang et al.

(10) Patent No.: US 12,167,239 B2
(45) Date of Patent: Dec. 10, 2024

(54) IDENTITY AUTHENTICATION METHOD AND APPARATUS

(71) Applicant: Huawei Technologies Co., Ltd., Shenzhen (CN)

(72) Inventors: Weiyu Jiang, Beijing (CN); Bingyang Liu, Beijing (CN); Junjie Wan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 17/680,980

(22) Filed: Feb. 25, 2022

(65) Prior Publication Data

US 2022/0182825 A1 Jun. 9, 2022

Related U.S. Application Data

(63) Continuation of application No. PCT/CN2020/085610, filed on Apr. 20, 2020.

(30) Foreign Application Priority Data

Aug. 30, 2019 (CN) .......................... 201910815346.X

(51) Int. Cl.
*H04W 12/08* (2021.01)
*H04W 12/06* (2021.01)
*H04W 12/75* (2021.01)

(52) U.S. Cl.
CPC ........... *H04W 12/06* (2013.01); *H04W 12/08* (2013.01); *H04W 12/75* (2021.01)

(58) Field of Classification Search
CPC ...... H04W 12/06; H04W 12/08; H04W 12/75
See application file for complete search history.

(56) References Cited

U.S. PATENT DOCUMENTS

2016/0295398 A1 10/2016 Ketheesan et al.
2017/0142205 A1 5/2017 Makke et al.
(Continued)

FOREIGN PATENT DOCUMENTS

CN 101150472 A 3/2008
CN 101610509 A 12/2009
(Continued)

OTHER PUBLICATIONS

3GPP TR 33.885 V14.1.0, Sep. 2017 "3rd Generation Partnership Project; Technical Specification Group Services and System Aspects; Study on Security Aspect for LTE support of V2X Services (Release 14)," 75 pages.
(Continued)

*Primary Examiner* — Michael T Vu
(74) *Attorney, Agent, or Firm* — Conley Rose, P.C.

(57) ABSTRACT

A method comprises generating, based on identity information of a user by an identity management server, a temporary privacy identity identifier of a terminal device, receiving, from the terminal device, a network access request comprising the temporary privacy identity identifier, generating an authentication key of the temporary privacy identity identifier based on the temporary privacy identity identifier and a primary identity authentication key of a domain to which the terminal device belongs, generating a first message based on the temporary privacy identity identifier and the authentication key, sending the first message to the terminal device, receiving a second message from the terminal device based on the first message, performing authentication on the second message based on the temporary privacy identity identifier and the authentication key, and allowing access to a network device by the terminal device after the authentication succeeds.

12 Claims, 14 Drawing Sheets

(56) References Cited

U.S. PATENT DOCUMENTS

| | | | | |
|---|---|---|---|---|
| 2018/0020351 A1* | 1/2018 | Lee | ...................... | H04L 9/0822 |
| 2018/0324307 A1* | 11/2018 | Weidenfeller | ...... | H04M 15/857 |
| 2018/0367978 A1 | 12/2018 | Targali | | |
| 2020/0100105 A1* | 3/2020 | Wang | .................. | H04W 12/086 |

FOREIGN PATENT DOCUMENTS

| | | |
|---|---|---|
| CN | 108848502 A | 11/2018 |
| WO | 2005034424 A1 | 4/2005 |

OTHER PUBLICATIONS

3GPP TS 33.501 V1.3.0, Aug. 2017, "3rd Generation Partnership Project; Technical Specification Group Services and System Aspects; Study on the security aspects of the next generation system (Release 14)," 605 pages.

3GPP TS 33.501 V0.5.0, Dec. 2017, "3rd Generation Partnership Project; Technical Specification Group Services and System Aspects; Security Architecture and Procedures for 5G System (Release 15)," 79 pages.

Peterson, J., et al., "Secure Telephone Identity Problem Statement and Requirements," RFC 7340, Sep. 2014, 25 pages.

3GPP TR 33.899, V1.3.0, Aug. 2017, Technical Report, "3rd Generation Partnership Project; Technical Specification Group Services and System Aspects; Study on the security aspects of the next generation system (Release 14)," 605 pages.

China Mobile "Editorial Changes to TR 33.835 v0.4.0," S3-192193, 3GPP TSG-SA WG3 Meeting #95Bis, Sapporo, Japan, Jun. 24-28, 2019, 14 pages.

Interdigital, "Editorial corrections for TR 33.835," S3-192521, 3GPP TSG-SA WG3 Meeting #96, Wroclaw, PL, Aug. 26-30, 2019, 29 pages.

* cited by examiner

IDENTITY AUTHENTICATION METHOD AND APPARATUS

CROSS-REFERENCE TO RELATED APPLICATIONS

This is a continuation of International Patent Application No. PCT/CN2020/085610 filed on Apr. 20, 2020, which claims priority to Chinese Patent Application No. 201910815346.X filed on Aug. 30, 2019. The disclosures of the aforementioned applications are hereby incorporated by reference in their entireties.

TECHNICAL FIELD

This application relates to the field of communications technologies, and in particular, to an identity authentication method and apparatus.

BACKGROUND

With the development of network technologies, the network increasingly penetrates into people's everyday life. When using the network, users often need to use private information such as their real names, identifier (ID) numbers, and bank accounts for some operations. Therefore, network security becomes more and more important. When a large quantity of devices request to access a network, a server performs identity authentication on the devices to prevent forged and unauthorized users from accessing the network and damaging the legitimate rights and interests of other users in a network management domain. However, there are still attacks from within the network management domain from time to time, and not all network environments are secure. This brings great threats to security of users' privacy information and properties. Therefore, an identity authentication method is needed to perform authentication on the identity of a user requesting to access the network such as to ensure security and reliability of the network environment.

Currently, an identity authentication method commonly used in the fifth generation (5G) future mobile phone system mainly includes the following procedure: user equipment performs encryption using an asymmetric cryptographic algorithm to avoid privacy disclosure (air interface monitoring) when accessing a network based on a subscriber permanent identifier (SUPI). In other words, the user equipment encrypts the SUPI using the asymmetric cryptographic algorithm, and sends an authentication request packet to an identity management server, the identity management server decrypts the authentication request packet according to the asymmetric cryptographic algorithm mechanism, and performs authentication after decryption; if authentication succeeds, an access server is notified to allow access by the user equipment.

In the foregoing implementation, although privacy protection for the SUFI based on asymmetric cryptography is used, some user equipment may send bogus request packets to attack network services. For such bogus request packets, the identity management server still needs to perform an authentication procedure after decryption, which occupies a large quantity of processing resources. As a result, normal request packets cannot be processed, and normal operation of the network service is greatly affected.

SUMMARY

Embodiments of this application provide an identity authentication method and apparatus, which ensures access security and user privacy and avoids an effect of a bogus request packet on normal operation of a network service.

According to a first aspect an identity authentication method is provided. The method includes receiving a network access request sent by a terminal device, where the network access request includes a temporary privacy identity identifier of the terminal device, and the temporary privacy identity identifier is generated by an identity management server based on identity information of a user, generating an authentication key of the temporary privacy identity identifier based on a primary identity authentication key of a domain to which the terminal device belongs and the temporary privacy identity identifier, generating a first message based on the temporary privacy identity identifier and the authentication key of the temporary privacy identity identifier, sending the first message to the terminal device, receiving a second message returned by the terminal device based on the first message, performing authentication on the second message based on the temporary privacy identity identifier and the authentication key of the temporary privacy identity identifier, and after the authentication succeeds, allowing access by the terminal device.

In the foregoing implementation process, when the terminal device has a network access requirement, the terminal device sends a network access request carrying a temporary privacy identity identifier to a network device, and performs message interaction and authentication with the network device based on an authentication key corresponding to the temporary privacy identity identifier. In this way, an identity authentication procedure is completed, where authentication can be performed on a network, and identity authentication can be performed on the terminal device. This mutual authentication procedure based on the temporary privacy identity identifier greatly improves network access security. The network device can implement identity authentication without maintaining an identity database, which can ensure that user privacy is not disclosed. In addition, in the identity authentication procedure, the network device can filter out a bogus request packet before the identity management server. In this way, processing pressure of the network device is greatly reduced, and occupation of a large quantity of processing resources is avoided such that processing of a normal request packet is not affected, and normal operation of the network service can be ensured.

In addition, a symmetric encryption mechanism is used in the foregoing process, and a calculation speed of the symmetric encryption mechanism is high such that a distributed denial of service (DDoS) attack on a centralized identity management server that uses a public key mechanism can be mitigated.

In a first possible implementation of the first aspect, after the receiving a network access request sent by a terminal device, the method further includes: when the network access request includes a domain identifier, if the network device stores an authentication key corresponding to the domain identifier, extracting the authentication key corresponding to the domain identifier to be the primary identity authentication key, and if the network device does not store an authentication key corresponding to the domain identifier, sending a primary identity authentication key request to the identity management server, and using an authentication key returned by the identity management server as the primary identity authentication key.

In the foregoing implementation process, after the primary identity authentication key is obtained, the authentication key of the temporary privacy identity identifier can be generated based on the primary identity authentication key and the temporary privacy identity identifier. The authentication key is used for generating and performing authentication on a first feature code and a second feature code, thereby implementing mutual authentication that is based on the temporary privacy identity identifier.

In a second possible implementation of the first aspect, the generating an authentication key of the temporary privacy identity identifier based on a primary identity authentication key of a domain to which the terminal device belongs and the temporary privacy identity identifier includes performing derivation calculation using a one-way function based on the primary identity authentication key of the domain to which the terminal device belongs and the temporary privacy identity identifier, to obtain the authentication key of the temporary privacy identity identifier.

In the foregoing implementation process, through derivation calculation using the one-way function, the authentication key of the temporary privacy identity identifier can be generated based on the temporary privacy identity identifier. The authentication key is used for generating and performing authentication on a first feature code and a second feature code, thereby implementing mutual authentication that is based on the temporary privacy identity identifier.

According to a second aspect, an identity authentication method is provided. The method includes sending a network access request to a network device, where the network access request includes a temporary privacy identity identifier within a validity period, and the temporary privacy identity identifier is generated by an identity management server based on identity information of a user, receiving a first message returned by the network device based on the access network request, performing authentication on the first message based on the temporary privacy identity identifier and an authentication key of the temporary privacy identity identifier within the validity period, and when the authentication succeeds, sending a second message to the network device based on the first message, the temporary privacy identity identifier, and the authentication key, where the second message is used by the network device to perform authentication.

In the foregoing implementation process, when the terminal device has a network access requirement, the terminal device sends a network access request carrying a temporary privacy identity identifier to a network device, and performs message interaction and authentication with the network device based on an authentication key corresponding to the temporary privacy identity identifier. In this way, an identity authentication procedure is completed, where authentication can be performed on a network, and identity authentication can be performed on the terminal device. This mutual authentication procedure based on the temporary privacy identity identifier greatly improves network access security. The network device can implement identity authentication without maintaining an identity database, which can ensure that user privacy is not disclosed. In addition, in the identity authentication procedure, for authentication request packets sent by the terminal device, the network device can filter out a bogus request packet in the authentication request packets before the identity management server. In this way, processing pressure of the network device is greatly reduced, and occupation of a large quantity of processing resources is avoided such that processing of a normal request packet is not affected, and normal operation of the network service can be ensured.

In a first possible implementation of the second aspect, performing the authentication on the first message based on the temporary privacy identity identifier and an authentication key of the temporary privacy identity identifier within the validity period includes generating a first authentication code based on the temporary privacy identity identifier, the authentication key, and a first random number carried in the network access request, and comparing the first authentication code with a first feature code carried in the first message, where when it is determined that the first authentication code and the first feature code are consistent, the authentication succeeds, or when it is determined that the first authentication code and the first feature code are inconsistent, the authentication fails.

In the foregoing implementation process, a procedure of performing authentication on the first message is provided, which can implement security authentication on a message returned by the network device such that authentication on the network device is completed, and validity of the network device is ensured.

In a second possible implementation of the second aspect, the second message carries message content and a second feature code, where the second feature code is generated based on the temporary privacy identity identifier, the authentication key, a second random number, and a first random number carried in the network access request.

In the foregoing implementation process, a procedure of generating a second message is provided such that after the authentication of the network device succeeds, information that can be used to perform authentication on the terminal device can be further provided for the network device to implement authentication on the terminal device by the network device. In this way, validity of the terminal device is ensured.

In a third possible implementation of the second aspect, before sending a network access request to a network device, the method further includes sending a temporary privacy identity identifier request to the identity management server, and receiving at least one temporary privacy identity identifier and at least one corresponding authentication key that are returned by the identity management server.

In the foregoing implementation process, a temporary privacy identity identifier and a corresponding authentication key may be obtained by sending a temporary privacy identity identifier request to the identity management server. For example, the temporary privacy identity identifier may replace a subscription concealed identifier (SUCI) as a user identifier such that user privacy is protected while identity authentication on the terminal device is implemented, and privacy disclosure is prevented.

In a fourth possible implementation of the second aspect, before sending the temporary privacy identity identifier request to an identity management server, the method further includes detecting validity periods of stored temporary privacy identity identifiers, and when the validity periods of all the stored temporary privacy identity identifiers expire, sending the temporary privacy identity identifier request to an identity management server.

In the foregoing implementation process, the validity periods of the temporary privacy identity identifiers stored in the terminal device are detected. When a stored temporary privacy identity identifier does not expire, the stored temporary privacy identity identifier may be used, and an identity managing device does not need to generate a temporary privacy identity identifier. In this way, device consumption is reduced, and authentication efficiency is improved. In addition, after a temporary privacy identity identifier expires, a new temporary privacy identity identifier can be obtained in a timely manner. Detection of the validity periods can avoid a situation such as privacy disclosure caused by hijacking of a temporary privacy identity identifier, thereby further enhancing privacy protection.

In a fifth possible implementation of the second aspect, the temporary privacy identity identifier request includes a target quantity, and the target quantity is a quantity of temporary privacy identity identifiers requested to be generated by the identity management server.

In the foregoing implementation process, the target quantity of temporary privacy identity identifiers is requested from the identity management server such that the identity management server does not generate too many or few temporary privacy identity identifiers, device consumption is reduced, and authentication efficiency is improved.

Further, the target quantity may be configured based on an actual service requirement such that sufficient temporary privacy identity identifiers are available for backup in different service scenarios, and signaling interaction required for obtaining temporary privacy identity identifiers can be reduced to some extent, which avoids applying processing pressure on the identity management server and the terminal device.

In a sixth possible implementation of the second aspect, the temporary privacy identity identifier includes a ciphertext obtained by encrypting the identity information with an encryption key of the identity management server and a random number.

In the foregoing implementation process, a feature code of the temporary privacy identity identifier can be generated based on a domain identifier of a domain to which the terminal device belongs, the ciphertext obtained by encrypting the identity information with the encryption key of the identity management server, and the random number, to further generate the temporary privacy identity identifier. User privacy is protected from disclosure while identity authentication is implemented.

In a seventh possible implementation of the second aspect, the temporary privacy identity identifier further includes at least one of the following: a domain identifier of a domain to which the terminal device belongs, a number of an encryption key, encryption algorithm information, a key length of the encryption key, a validity period, and a feature code of the temporary privacy identity identifier.

In the foregoing implementation process, based on the foregoing at least one piece of information, the temporary privacy identity identifier can carry a larger amount of information. This reduces a calculation amount of a receiver side during parsing.

According to a third aspect, an identity authentication method is provided. The method includes receiving a temporary privacy identity identifier request from a terminal device, where the temporary privacy identity identifier request carries identity information of a user of the terminal device, generating, based on the identity information of the user of the terminal device, at least one temporary privacy identity identifier and at least one corresponding authentication key, and sending the at least one temporary privacy identity identifier and the at least one corresponding authentication key to the terminal device.

In the foregoing implementation process, the identity management server may generate the at least one temporary privacy identity identifier and the at least one corresponding authentication key for the terminal device, and send the at least one temporary privacy identity identifier and the at least one corresponding authentication key to the terminal device. Then, the terminal device can complete an identity authentication procedure based on the foregoing temporary privacy identity identifier and corresponding authentication key. In this way, network authentication is implemented, and identity authentication of the terminal device can also be implemented. This mutual authentication procedure based on the temporary privacy identity identifier ensures access security and user privacy and avoids an effect of a bogus request packet on normal operation of the network service.

Further, the temporary privacy identity identifier is generated based on the identity information such that an auditor needs only a decryption key to perform audit operations such as source tracing and accountability on data traffic of the temporary privacy identity identifier.

Because validity of the temporary privacy identity identifier is temporary, a situation in which a network element on a network access side identifies permanent identity information, and performs correlation and tracing analysis on privacy can be avoided, which enhances privacy protection.

In a first possible implementation of the third aspect, after sending the at least one temporary privacy identity identifier and the at least one corresponding authentication key to the terminal device, the method further includes receiving a primary identity authentication key request sent by a network device, and sending one authentication key of the at least one authentication key corresponding to the at least one temporary privacy identity identifier to the network device based on the primary identity authentication key request.

In the foregoing implementation process, one authentication key of the at least one authentication key corresponding to the at least one temporary privacy identity identifier is sent to the network device such that the network device can obtain a primary identity authentication key, and further derive the authentication key corresponding to the temporary privacy identity identifier through calculation. The authentication keys are used to generate and perform authentication on the first feature code and the second feature code.

In a second possible implementation of the third aspect, generating, based on the identity information of the user of the terminal device, the at least one temporary privacy identity identifier and the at least one corresponding authentication key includes obtaining a private key corresponding to the identity information, generating, based on the private key, an encryption key and an integrity authentication key, encrypting the identity information based on the encryption key to obtain a ciphertext, obtaining a feature code of the temporary privacy identity identifier based on a management domain identifier of the terminal device, the integrity authentication key, and the ciphertext, generating at least one temporary privacy identity identifier based on the feature code of the temporary privacy identity identifier, and generating at least one authentication key corresponding to the at least one temporary privacy identity identifier based on a primary identity authentication key.

In the foregoing implementation process, an example method for generating the temporary privacy identity identifier and the corresponding authentication key is provided. According to the method, the identity information is replaced by the temporary privacy identity identifier, and privacy protection is implemented. In addition, the authentication key can be used to implement subsequent identity authentication.

In a third possible implementation of the third aspect, obtaining the private key corresponding to the identity information includes either of the following steps: selecting one private key from the generated at least one key, and generating a private key corresponding to the identity information according to a key generation policy.

In the foregoing implementation process, the private key may be reused or may be generated according to a policy for generating the temporary privacy identity identifiers subsequently. This further provides privacy protection.

According to a fourth aspect, an identity authentication apparatus is provided. The apparatus is configured to perform the foregoing identity authentication method. The identity authentication apparatus further includes a functional module configured to perform the foregoing identity authentication method.

According to a fifth aspect, a chip is provided. The chip includes a processing circuit and an input/output (I/O) interface that is internally connected to and communicated with the processing circuit. The processing circuit and the (I/O) interface are configured to implement corresponding steps according to the foregoing identity authentication method.

According to a sixth aspect, a chip is provided. The chip includes one or more processors and one or more memories. The one or more memories store at least one instruction, and the instruction is loaded and executed by the one or more processors to implement operations performed in the foregoing identity authentication method.

According to a seventh aspect, a terminal device is provided. The terminal device includes one or more processors and one or more memories. The one or more memories store at least one instruction, and the instruction is loaded and executed by the one or more processors to implement operations performed in the foregoing identity authentication method.

According to an eighth aspect, a network device is provided. The network device includes one or more processors and one or more memories. The one or more memories store at least one instruction, and the instruction is loaded and executed by the one or more processors to implement operations performed in the foregoing identity authentication method.

According to a ninth aspect, a computer-readable storage medium is provided. The computer-readable storage medium stores instructions. When the instructions are run on a computer, the computer performs the identity authentication method according to the foregoing aspects.

According to a tenth aspect, a computer program product including instructions is provided. When the computer program product runs on a computer, the computer performs the method in the foregoing aspects.

When a terminal device has a network access requirement, the terminal device sends a network access request carrying a temporary privacy identity identifier to a network device, and performs message interaction and authentication with the network device based on an authentication key corresponding to the temporary privacy identity identifier, to complete an identity authentication procedure. In this way, network authentication can be implemented, and identity authentication of the terminal device can also be implemented. This mutual authentication procedure based on the temporary privacy identity identifier ensures access security and user privacy and avoids an effect of a bogus request packet on normal operation of the network service.

DESCRIPTION OF EMBODIMENTS

The following further describes in detail implementations of this application with reference to accompanying drawings.

Figure 1:
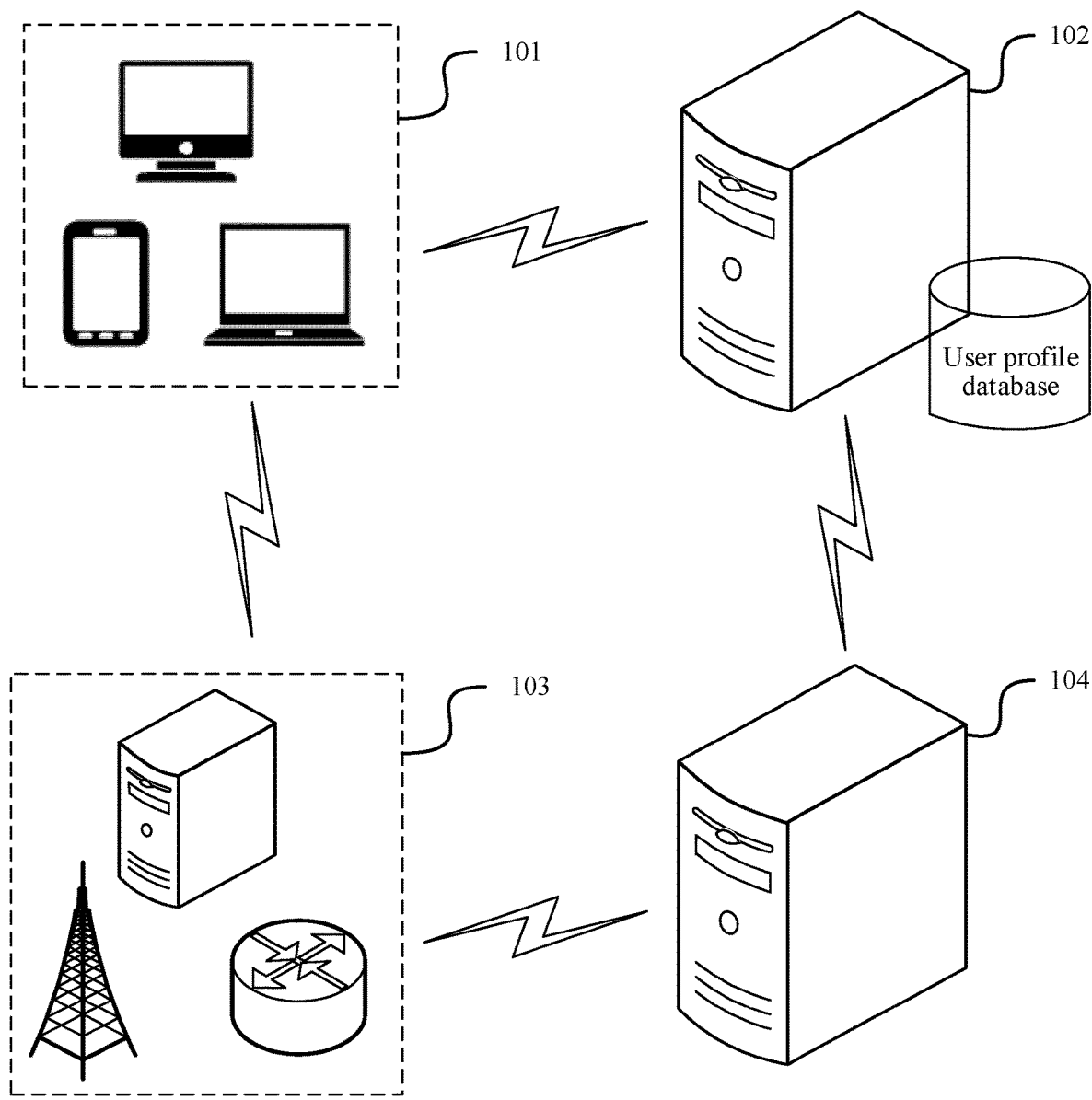
FIG. 1 is a schematic diagram of an application scenario of an identity authentication method according to an embodiment of this application.

FIG. 1 is a schematic diagram of an application scenario of an identity authentication method according to an embodiment of this application. Refer to FIG. 1, an application scenario of the identity authentication method includes a terminal device 101, an identity management server 102, and a network device 103. Further, an implementation environment may include an audit server 104.

The terminal device 101 may be referred to user equipment (UE), an access terminal, a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, or a terminal device and a smart home device in a future evolved public land mobile network (PLMN). As an example rather than a limitation, in the embodiments of this application, the terminal device may be alternatively a wearable device. The wearable device may also be referred to as a wearable intelligent device, and is a general term of wearable devices, such as glasses, gloves, watches, clothes, and shoes, that are developed by applying wearable technologies to intelligent designs of daily wear. A wearable device is a portable device that can be directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs. The smart home device may be a home device that has a communication capability, such as an air conditioner, a television, or a water heater. The terminal device 101 may communicate with the identity management server 102, the network device 103, and the like through a secure channel. There may be one or more terminal devices 101. This is not limited in this embodiment of this application.

The identity management server 102 may be any one of one server, a plurality of servers, a virtualization center, and the like. The identity management server 102 manages a user identity, for example, generates a temporary privacy identity identifier, issues a temporary privacy identity identifier (namely, a credential), and the like, and may further manage a user profile database. For example, a temporary privacy identity identifier may be generated based on user identity information in the user profile database. The identity management server 102 may communicate with the terminal device 101, the network device 103, the audit server 104, and the like through a secure channel.

The network device 103 may be at least one of a router, a base station (for example, a 5G base station), a server that is provided by an operator and that is close to a user side, and the like that can provide an access network service. The network device 103 is responsible for performing authentication on a user that is about to access a network such as to ensure that a user that accesses the network is authorized. The network device 103 may communicate with the terminal device 101, the identity management server 102, the audit server 104, and the like through a secure channel. There may be one or more network devices 103. This is not limited in this embodiment of this application.

The audit server 104 may be any one of one server, a plurality of servers, a cloud computing platform, a virtualization center, and the like. The audit server 104 and the identity management server may belong to a same trust domain (for example, a management domain), and are responsible for performing authentication on a real identity in a temporary privacy identity identifier carried in network traffic when there is a requirement to perform legal audit on the network traffic. The audit server 104 may communicate with the network device 103, the identity management server 102, and the like through communication connection. It should be noted that, the belonging to a same trust domain means that a trust relationship is established between servers, and a data interaction operation may be performed. The data interaction operation includes but is not limited to data transmission, data query, data obtaining, and the like.

Figure 2:
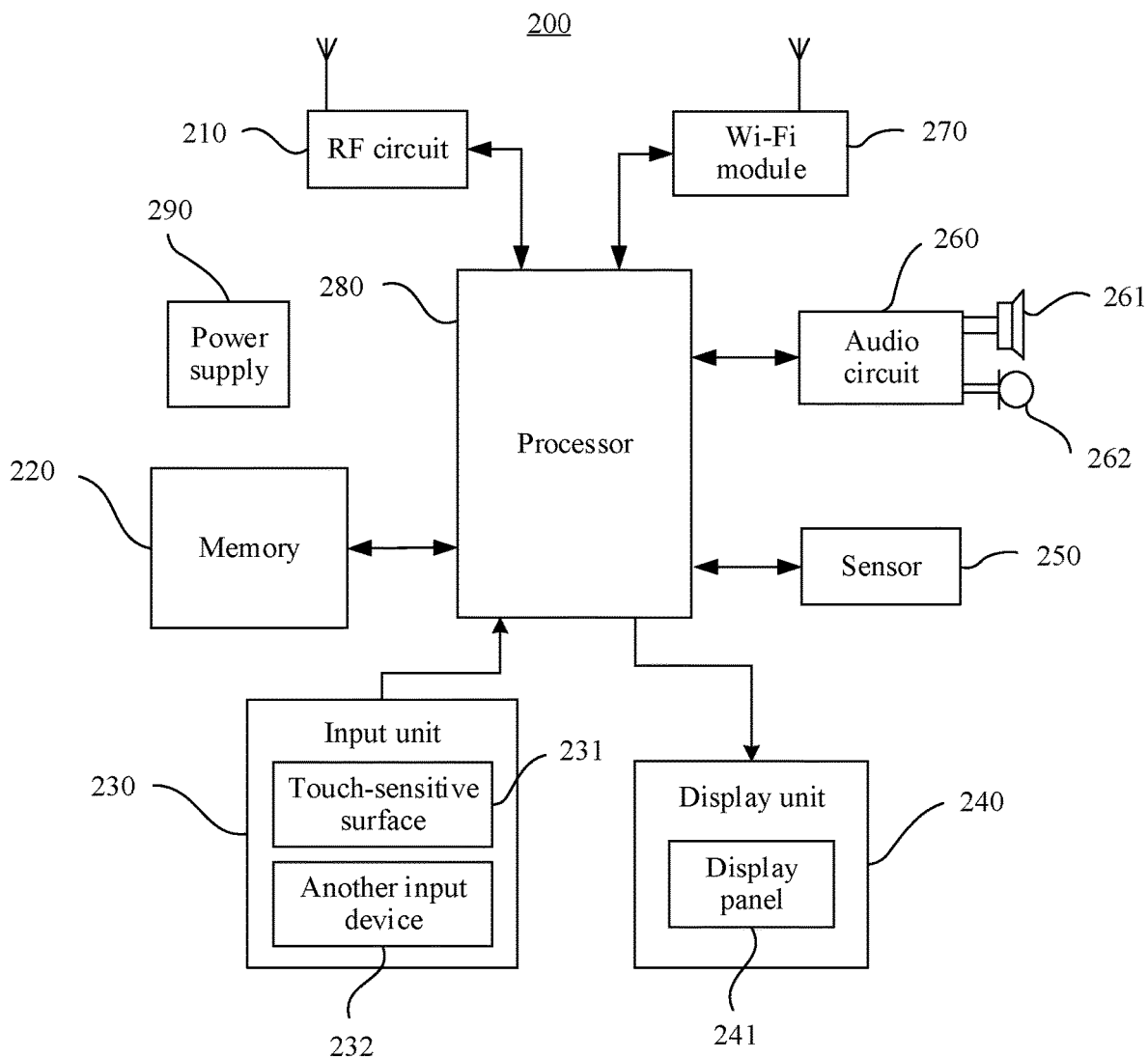
FIG. 2 is a schematic diagram of a structure of a terminal device according to an embodiment of this application.

FIG. 2 is a schematic diagram of a structure of a terminal device according to an embodiment of this application. The terminal device may be configured to perform the identity authentication method provided in the following embodiments. Refer to FIG. 2, the terminal device 200 includes the following components.

The terminal device 200 may include parts such as a radio frequency (RF) circuit 210, a memory 220 that includes one or more computer-readable storage media, an input unit 230, a display unit 240, a sensor 250, an audio circuit 260, a, Wi-Fi module 270, a processor 280 that includes one or more processing cores, and a power supply 290. It may be understood by a person skilled in the art that, the structure of the terminal device shown in FIG. 2 does not constitute any limitation on the terminal device, and the terminal may include more or fewer components than those shown in the figure, or combine some components, or have different component arrangements.

The RF circuit 210 may be configured to receive and send a signal in an information receiving or sending process or during a call, and in particular, after receiving downlink information from a base station, send the downlink information to one or more processors 280 for processing, and in addition, send related uplink data to the base station. Generally, the RF circuit 210 includes but is not limited to an antenna, at least one amplifier, a tuner, one or more oscillators, a subscriber identity module (SIM) card, a transceiver, a coupler, a low-noise amplifier (LNA), a duplexer, and the like. In addition, the RF circuit 210 may further communicate with a network and another device through wireless communication. The wireless communication may use any communication standard or protocol, including but not limited to a Global System for Mobile Communications (GSM), a general packet radio service (GPRS), code-division multiple access (CDMA), wideband CDMA (WCDMA), Long-Term Evolution (LTE), an email, a short message service (SMS), and the like.

The memory 220 may be configured to store a software program and a module. The processor 280 performs various function applications and data processing by running the software program and the module stored in the memory 220. The memory 220 may mainly include a program storage area and a data storage area, where the program storage area may store an operating system, an application program that is required by at least one function (such as a sound playing function or an image playing function), and the like, and the data storage area may store data (such as audio data or an address book) that is created based on use of the terminal device 200, and the like. In addition, the memory 220 may include a high-speed random access memory, and may further include a nonvolatile memory, for example, at least one magnetic disk storage device, a flash storage device, or another volatile solid-state storage device. Correspondingly, the memory 220 may further include a memory controller, to provide the processor 280 and the input unit 230 with access to the memory 220.

The input unit 230 may be configured to: receive input digital or character information, and produce signal input that is of a keyboard, a mouse, a joystick, optics, or a trackball and that is related to user setting and functional control. Specifically, the input unit 230 may include a touch-sensitive surface 231 and another input device 232. The touch-sensitive surface 231, also referred to as a touchscreen or a touchpad, may collect a touch operation (such as an operation that a user performs on the touch-sensitive surface 231 or near the touch-sensitive surface 231 using a finger, a stylus, or any other suitable object or accessory) of the user on or near the touch-sensitive surface, and drive a corresponding connection apparatus based on a preset program. Optionally, the touch-sensitive surface 231 may include two parts: a touch detection apparatus and a touch controller. The touch detection apparatus detects a touch location of the user, detects a signal brought by a touch operation, and transmits the signal to the touch controller. The touch controller receives touch information from the touch detection apparatus, converts the touch information into touch coordinates, and sends the touch coordinates to the processor 280. In addition, the touch controller can receive and execute a command sent by the processor 280. In addition, the touch-sensitive surface 231 may be implemented by a resistive, capacitive, infrared, or surface acoustic touch-sensitive surface. In addition to the touch-sensitive surface 231, the input unit 230 may further include another input device 232. Another input device 132 may include but is not limited to one or more of a physical keyboard, a function key (such as a volume control key or a power on/off key), a trackball, a mouse, a joystick, and the like.

The display unit 240 may be configured to display information input by the user or information provided to the user, and various graphic user interfaces of the terminal device 200, and the graphic user interfaces may include a graphic, a text, an icon, a video, and any combination thereof. The display unit 240 may include a display panel 241. Optionally, the display panel 241 may be configured in a form of a liquid-crystal display (LCD), an organic light-emitting diode (OLED), or the like. Further, the touch-sensitive surface 231 may cover the display panel 241. When detecting the touch operation on or near the touch-sensitive surface 231, the touch-sensitive surface 231 transmits the touch operation to the processor 280 to determine a type of a touch event, and then the processor 280 provides corresponding visual output on the display panel 241 based on the type of the touch event. Although the touch-sensitive surface 231 and the display panel 241 are used as two independent components to implement input and input functions in FIG. 2, in some embodiments, the touch-sensitive surface 231 may be integrated with the display panel 241 to implement the input and output functions.

The terminal device 200 may further include at least one type of sensor 250, such as a light sensor, a motion sensor, and another sensor. Specifically, the light sensor may include an ambient light sensor and a proximity sensor. The ambient light sensor may adjust luminance of the display panel 241 based on brightness of an ambient light. The proximity sensor may turn off the display panel 241 and/or backlight when the terminal device 200 moves to an ear. As a motion sensor, a gravity acceleration sensor can detect a value of acceleration in each direction (generally, three axes), can detect a value and a direction of the gravity in static mode, and can be used for an application that identifies a phone gesture (such as screen orientation switching, related games, and magnetometer gesture calibration), a function related to vibration identification (such as a pedometer and a knock), and the like. For the terminal device 200, a gyroscope, a barometer, a hygrometer, a thermometer, an infrared sensor, and other sensors can be further configured, which are not described in detail herein.

The audio circuit 260, a loudspeaker 261, and a microphone 262 can provide an audio interface between a user and the terminal device 200. The audio circuit 260 may transmit, to the loudspeaker 261, an electrical signal converted from received audio data, and the loudspeaker 261 converts the electrical signal into a sound signal for output. In addition, the microphone 262 converts a collected sound signal into an electrical signal, the audio circuit 260 converts the electrical signal into audio data after receiving the electrical signal and outputs the audio data to the processor 280 for processing, and then the audio data is sent to, for example, another terminal device using the RF circuit 210, or the audio data is output to the memory 220 for further processing. The audio circuit 260 may probably include an earplug jack, to provide an external earphone for communicating with the terminal device 200.

Wi-Fi is a short distance wireless transmission technology. The terminal device 200 may help using the Wi-Fi module 270, the user to receive and send emails, browse a web page, access streaming media, and the like, to provide wireless broadband internet access for the user. Although the Wi-Fi module 270 is shown in FIG. 2, it may be understood that the Wi-Fi module 270 is not a mandatory component of the terminal device 200, and may be omitted based on a requirement provided that the essence of the present disclosure is not changed.

The processor 280 is a control center of the terminal device 200 and connects various parts of an entire mobile phone using various interfaces and lines. The processor 280 executes various functions of the terminal device 200 and processes data by running or executing the software program and/or module stored in the memory 220 and by invoking data stored in the memory 220, to perform overall monitoring on the mobile phone. Optionally, the processor 280 may include the one or more processing cores. Optionally, the processor 280 may integrate an application processor and a modem processor. The application processor mainly processes an operating system, a user interface, an application program, and the like, and the modem processor mainly processes wireless communication. It may be understood that the modem processor may not be integrated into the processor 280.

The terminal device 200 further includes the power supply 290 (such as a battery) that supplies power to the parts. Optionally, the power supply may be logically connected to the processor 280 using a power management system such that functions such as charging, discharging, and power consumption management are implemented using the power management system. The power supply 290 may further include any components such as one or more direct current or alternating current power supplies, a recharging system, a power failure detection circuit, a power converter or an inverter, and a power status indicator.

Although not shown, the terminal device 200 may further include a camera, a BLUETOOTH module, and the like, and details are not described herein. In this embodiment, the display unit of the terminal device may be a touchscreen display, and the terminal device further includes the memory and one or more programs, where the one or more programs are stored in the memory and are executed by one or more processors after being configured. The one or more programs includes instructions used to execute an identity authentication method on a terminal side.

Figure 3:
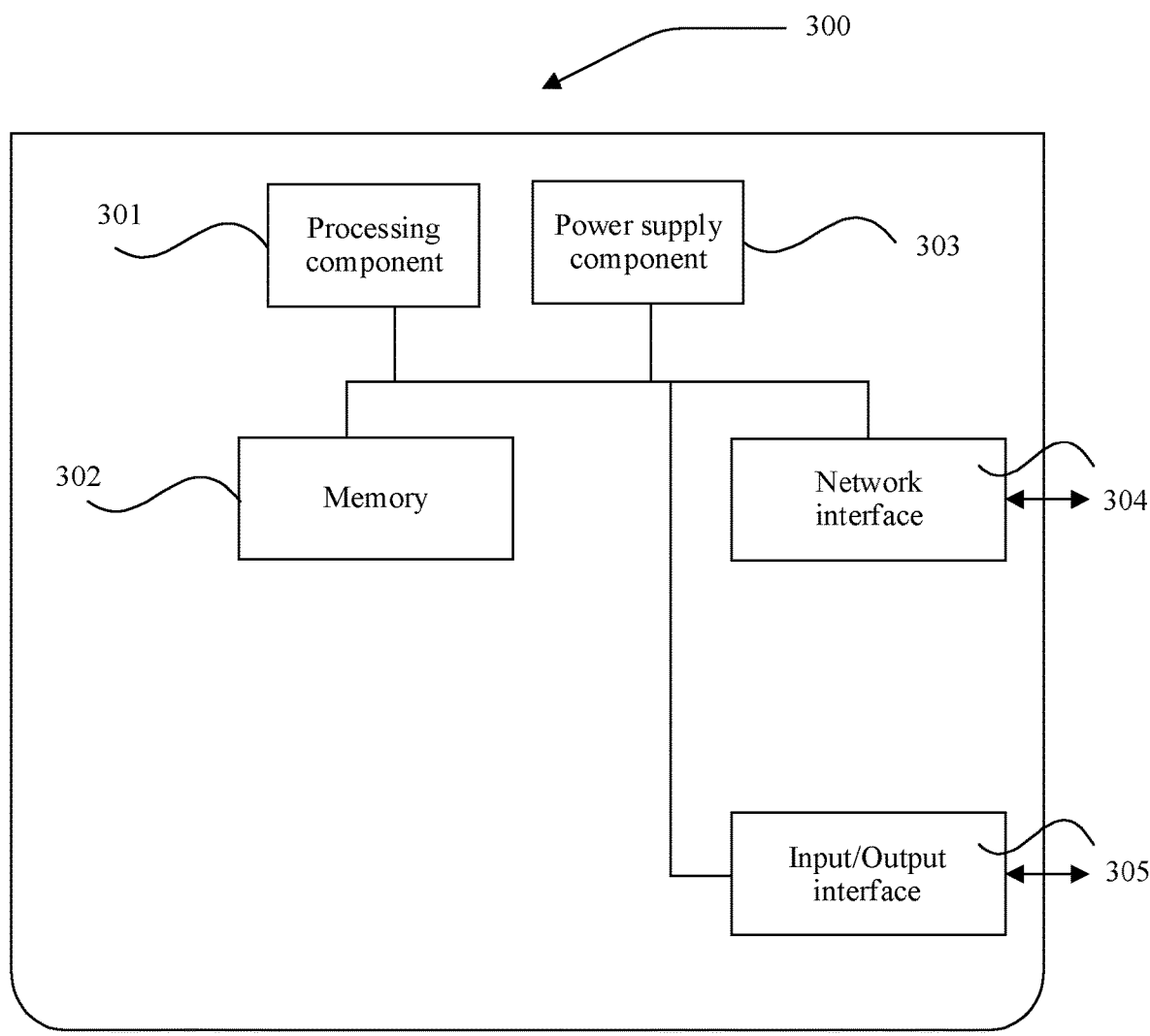
FIG. 3 is a block diagram of a network device 300 according to an example embodiment.

FIG. 3 is a block diagram of a network device 300 according to an example embodiment. For example, the network device 300 may be provided as any network device such as a server, a base station, or a router. Refer to FIG. 3, the network device 300 includes a processing component 301, which further includes one or more processors, and a storage resource represented by a memory 302 that is configured to store instructions that may be executed by the processing component 301, for example, an application program. The application program stored in the memory 302 may include one or more modules, where each module corresponds to a set of instructions. In addition, the processing component 301 is configured to execute instructions, to perform an identity authentication method on the network device side.

The network device 300 may further include a power supply component 303 configured to perform power management of network device 300, a wired or wireless network interface 304 configured to connect the network device 300 to a network, and an I/O interface 305. The network device 300 may operate an operating system, for example, Windows Server™, Mac OS X™ Unix™, Linux™, or FreeBSD™ based on the memory 302.

Figure 4:
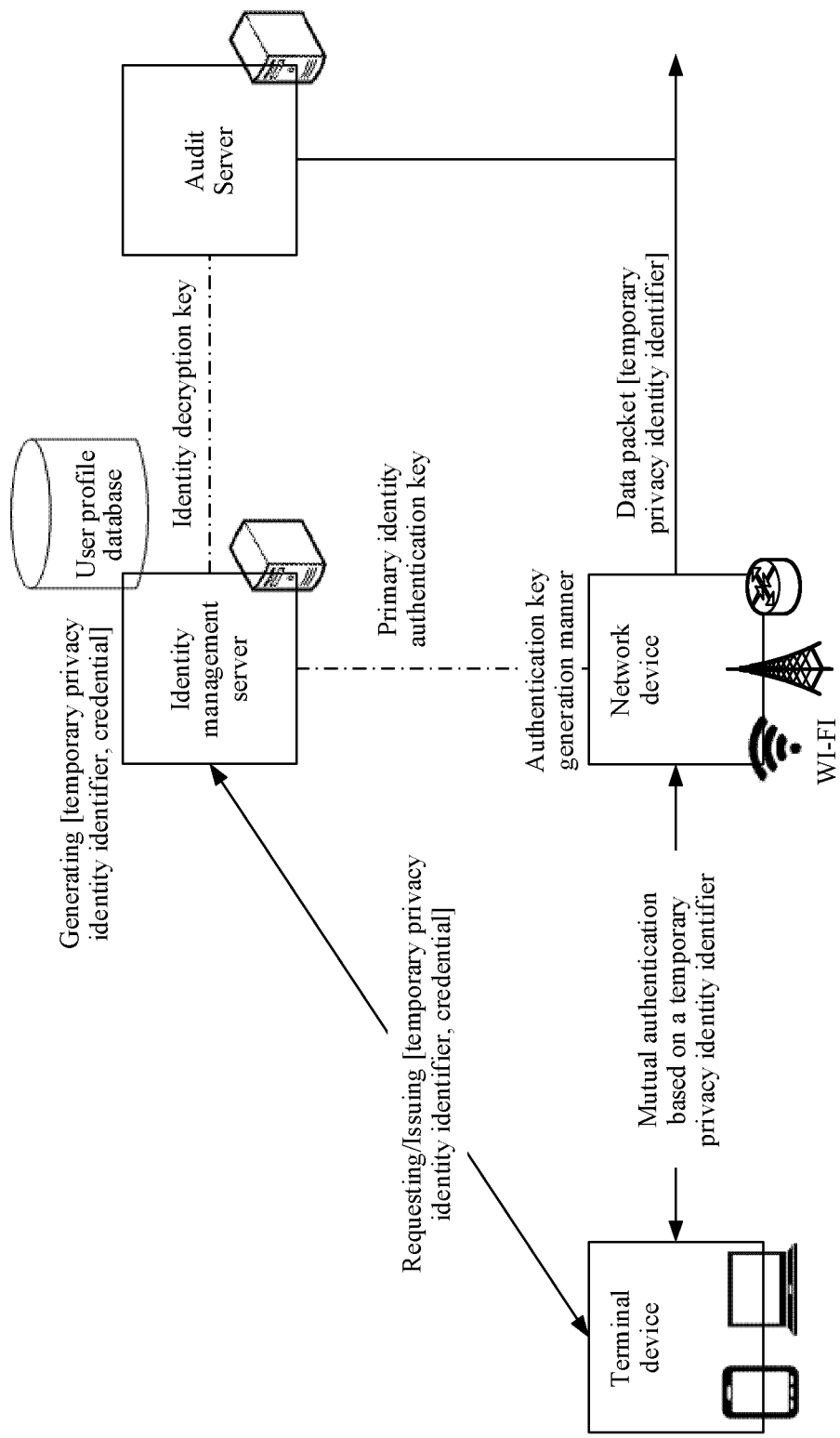
FIG. 4 is a schematic diagram of an architecture of an identity authentication system according to an embodiment of this application.

FIG. 4 shows a brief interaction procedure of each interaction subject in the implementation environment shown in FIG. 1. As shown in FIG. 4, a terminal device 101 may be configured to request a temporary privacy identity identifier from an identity management server, and perform mutual authentication with a network device based on the temporary privacy identity identifier, to implement identity authentication and access a network. The identity management server 102 may be configured to generate a temporary privacy identity identifier, send the temporary privacy identity identifier to the terminal device, and send a primary identity authentication key to the network device, to implement identity authentication. The network device may be configured to generate an authentication key, and perform mutual authentication with the terminal device, to implement identity authentication. An audit server may be configured to decrypt a data packet carrying a temporary privacy identity identifier with an identity decryption key to implement message source tracing.

To describe the procedure in this embodiment of this application more clearly, the following describes the identity authentication method in two parts. A first part is a procedure for generating and distributing a temporary privacy identity identifier, and a second part is a procedure for mutual authentication based on a temporary privacy identity identifier.

Figure 5A:
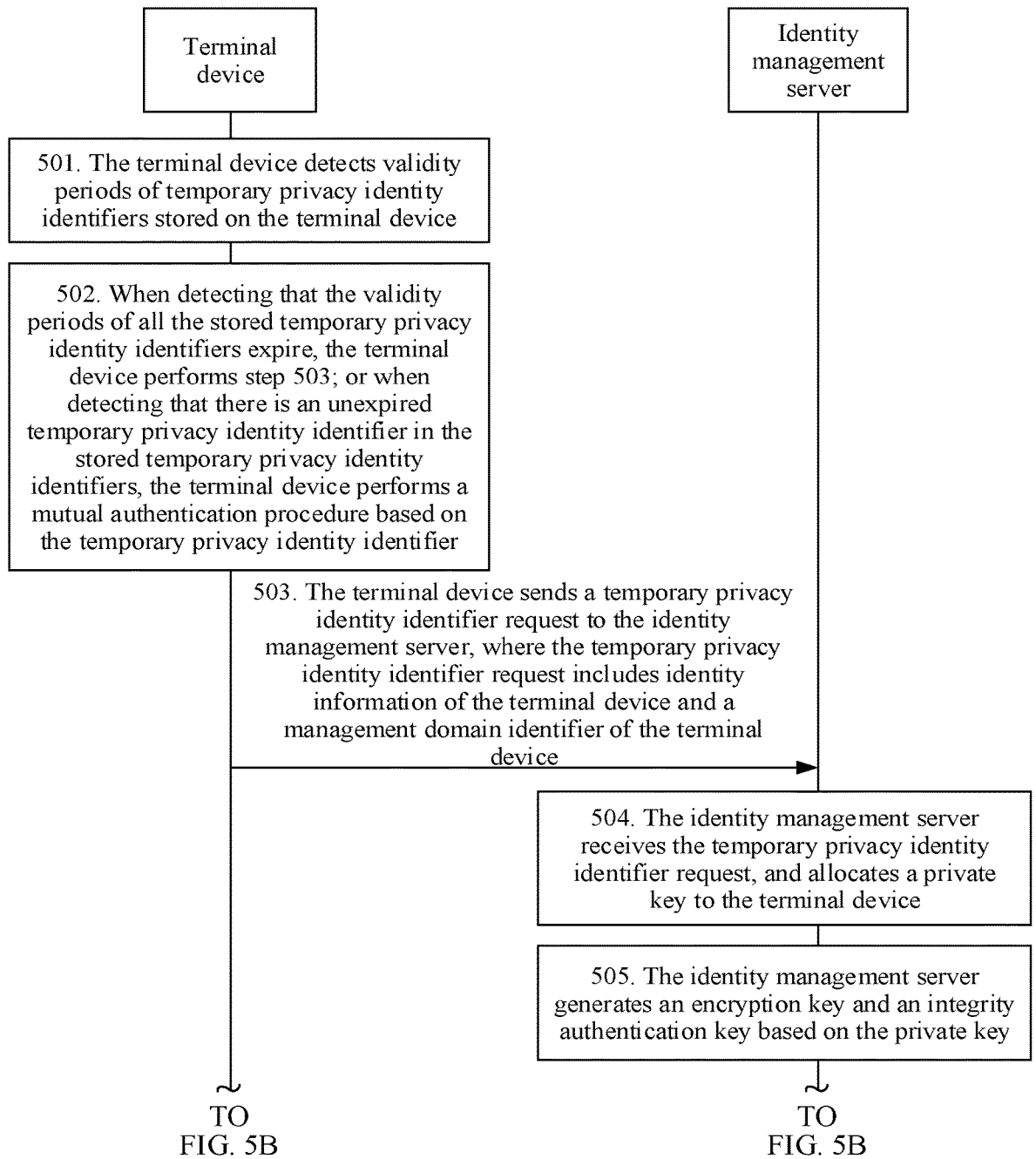
FIG. 5A and FIG. 5B are a flowchart of a method for requesting, generating, and distributing a temporary privacy identity identifier according to an embodiment of this application.
Figure 5B:
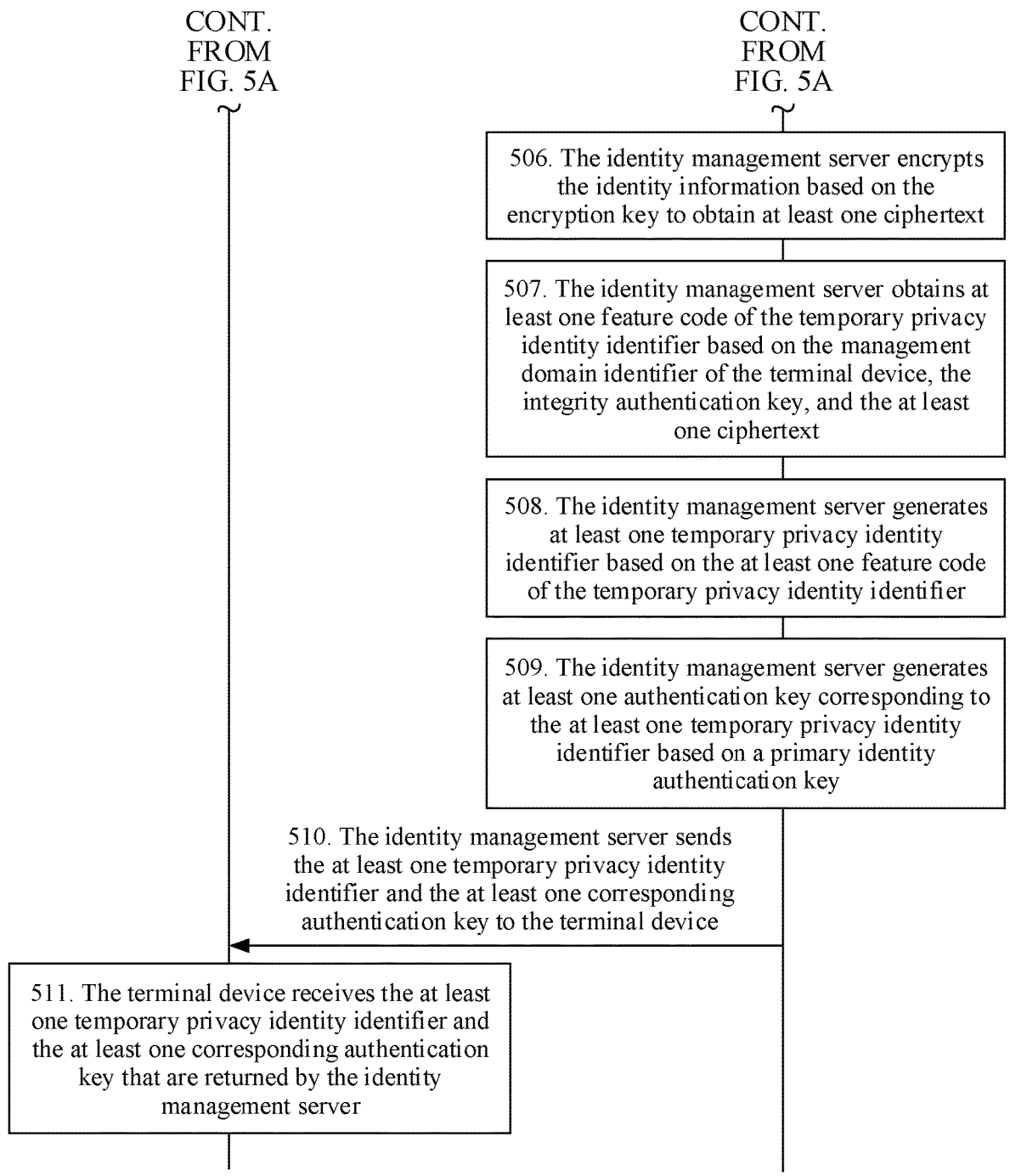

For the first part, that is, the procedure for generating and distributing the temporary privacy identity identifier, refer to the flowchart in FIG. 5A and FIG. 5B. The method includes the following steps.

Step 501. A terminal device detects validity periods of temporary privacy identity identifiers stored on the terminal device.

The temporary privacy identity identifier may have a validity period. When a validity period of any temporary privacy identity identifier expires, the temporary privacy identity identifier cannot be used any more. In this case, the terminal device may apply for a new temporary privacy identity identifier, or use an existed user identifier such as a SUCI for a subsequent procedure. The validity period may be a time period in which the temporary privacy identity identifier can be used as a user identifier. Within the validity period, the temporary privacy identity identifier may replace a SUCI as the user identifier.

It should be noted that the temporary privacy identity identifier on the terminal device may be stored correspondingly with an authentication key such that subsequent identity authentication procedure may be performed based on a correspondence between the temporary identity identifier and the authentication key.

Figure 6:
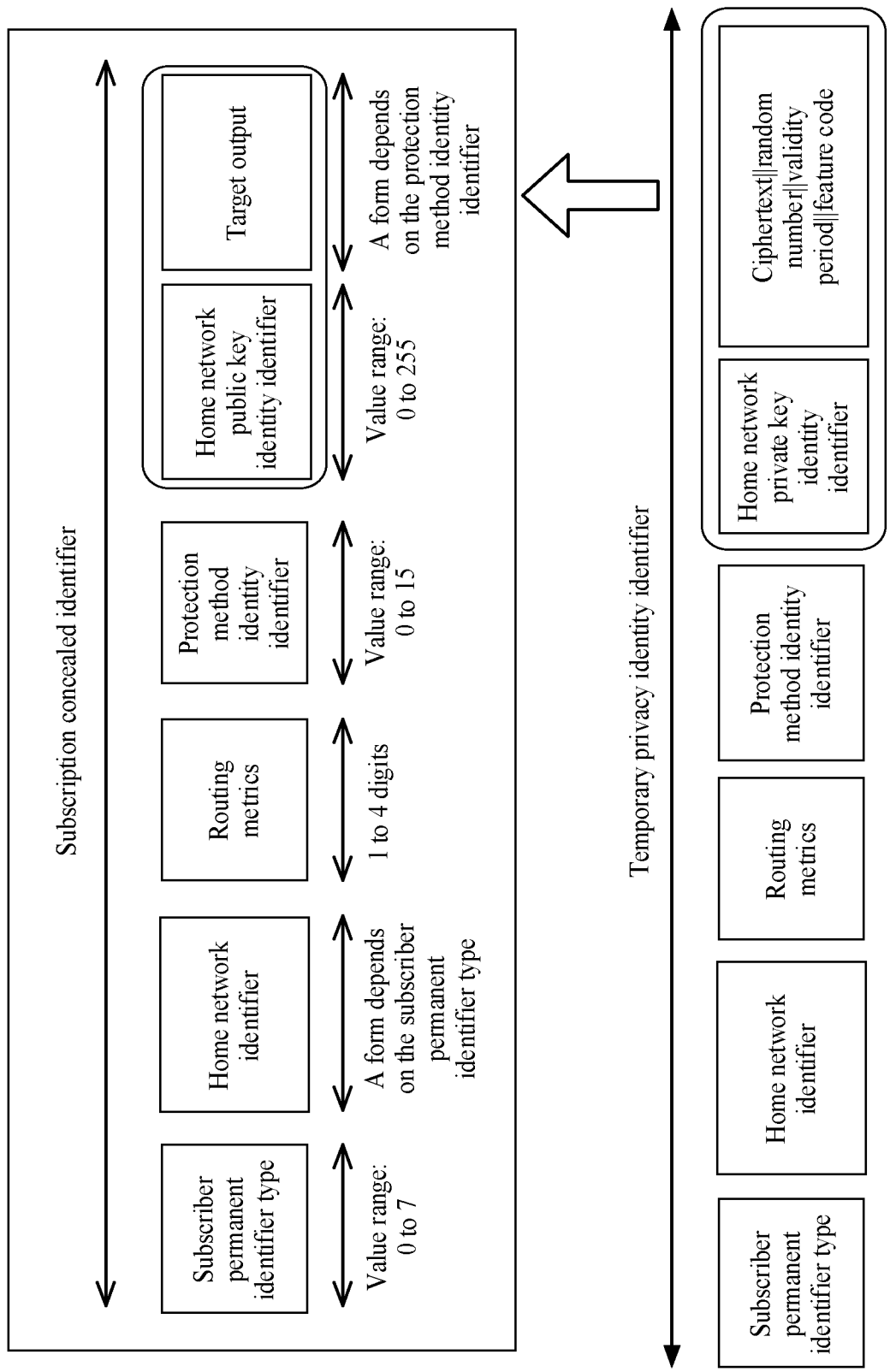
FIG. 6 is a schematic diagram comparing formats of a temporary privacy identity identifier and a SUCI according to an embodiment of this application.

FIG. 6 is a schematic diagram comparing formats of a temporary privacy identity identifier and a SUCI according to an embodiment of this application. Refer to FIG. 6, the SUCI and the temporary privacy identity identifier may have a same field, for example, a SUPI type field, a home network ID field, a routing indicator field, and a protection scheme ID field. The last two fields in the SUCI are a home network public key ID field and a scheme output field. The last two fields in the temporary privacy identity identifier may be a home network private key ID field and $C_{ID}\|IV\|Exp\ Time\|MAC$.

$C_{ID}$ is a ciphertext of identity information. IV indicates a random number. Exp Time indicates a validity period of the temporary privacy identity identifier. MAC indicates a feature code. For example, MAC may be a hash-based message authentication code (HMAC). $\|$ represents concatenation.

Certainly, the temporary privacy identity identifier may alternatively use another format, and only carries the foregoing ciphertext, random number, validity period, and feature code. It should be noted that the concatenation manner indicated in the foregoing example is merely a concatenation example. In some possible implementations, information may be concatenated in another order. This is not limited in this embodiment of this application.

Step 502: When detecting that the validity periods of all the stored temporary privacy identity identifiers expire, the terminal device performs step 503. When detecting that there is an unexpired temporary privacy identity identifier in the stored temporary privacy identity identifiers, the terminal device performs a mutual authentication procedure based on the temporary privacy identity identifier.

In a possible implementation, the terminal device may compare the current system time with the validity period of the stored temporary privacy identity identifier. Different comparison results may correspond to the following different implementation processes:

For any temporary privacy identity identifier, if the current system time is not within a validity period of the temporary privacy identity identifier, it is determined that the validity period of the temporary privacy identity identifier expires, and step 503 to step 511 are performed. Optionally, after determining that the validity period expires, the terminal device may discard the expired temporary privacy identity identifier to save storage space of the terminal device.

If the current system time is within a validity period of the temporary privacy identity identifier, it is determined that the validity period of the temporary privacy identity identifier does not expire, and the temporary privacy identity identifier can be directly used to perform a subsequent procedure for mutual authentication based on the temporary privacy identity identifier.

Step 503: The terminal device sends a temporary privacy identity identifier request to an identity management server. The temporary privacy identity identifier request includes identity information of the terminal device and a management domain identifier of the terminal device.

In a possible implementation, when the terminal device is connected to the identity management server, the terminal device actively sends the temporary privacy identity identifier request to the identity management server according to a security policy of the terminal device. The temporary privacy identity identifier request may include identity information of the terminal device, a management domain identifier of the terminal device, and the like. Optionally, the temporary privacy identity identifier request may further include a target quantity. Content included in the temporary privacy identity identifier request is not limited in this embodiment of this application.

The target quantity may be a quantity of temporary privacy identity identifiers that the identity management server is requested to generate. A value of the target quantity may be determined by the terminal device according to the security policy of the terminal device. The value of the target quantity is not limited in this embodiment of this application.

Step 504: The identity management server receives the temporary privacy identity identifier request and allocates a private key to the terminal device.

In a possible implementation, the identity management server may reuse a generated private key, or may generate a new private key for the terminal device. In other words, the procedure for allocating a private key to the terminal device may include either of the following implementations. (1) The identity management server generates a plurality of keys in advance, and selects one key from the generated keys as a private key $K_s$ when receiving the temporary privacy identity identifier request. (2) The identity management server generates a private key $K_s$ corresponding to the identity information of the terminal device in the temporary privacy identity identifier according to a key generation policy. A specific manner for allocating the private key is not limited in this embodiment of this application.

Step 505: The identity management server generates an encryption key and an integrity authentication key based on the private key.

In a possible implementation, the identity management server may perform derivation calculation on the private key $K_s$ using a one-way function of a key derivation algorithm to obtain the encryption key $K_{s\_enc}$ and the integrity authentication key $K_{s\_mac}$.

It should be noted that the one-way function used for generating the encryption key $K_{s\_enc}$ and for generating the integrity authentication key $K_{s\_mac}$ may be different one-way functions. For example, $K_{s\_enc}=KDF_1(K_s)$, $K_{s\_mac}=KDF_2(K_s)$, where $KDF_1$ and $KDF_2$ are two different one-way functions that meet a requirement.

The one-way function may be implemented using a cipher-based message authentication code (CMAC) algorithm, for example, a cipher block chaining message authentication code (CBC-MAC) or a cipher feedback message authentication code (CFB-MAC) implemented according to an advanced encryption standard (AES), or is implemented using an HMAC algorithm, for example, an HMAC function such as HMAC-secure hash algorithm (SHA)256 or HMAC-SHA512. A specific type of the one-way function is not limited in this embodiment of this application.

Step 506: The identity management server encrypts the identity information based on the encryption key to obtain at least one ciphertext.

In a possible implementation, the following encryption manner may be used in step 506 to obtain the ciphertext. In other words, step 506 may include: the identity management server may use an encryption mode similar to cipher block chaining (CBC) to encrypt the identity information to obtain a ciphertext. One ciphertext corresponds to one random number.

The foregoing encryption procedure may be represented using the following expression: $C_{ID}=E[K_{s\_enc}, (IV\ XOR\ ID)]$. $C_{ID}$ indicates the ciphertext of the identity information. IV indicates a random number. XOR indicates an exclusive OR operation. $K_{s\_enc}$ indicates the encryption key. E[ ] indicates an encryption algorithm.

Figure 7:
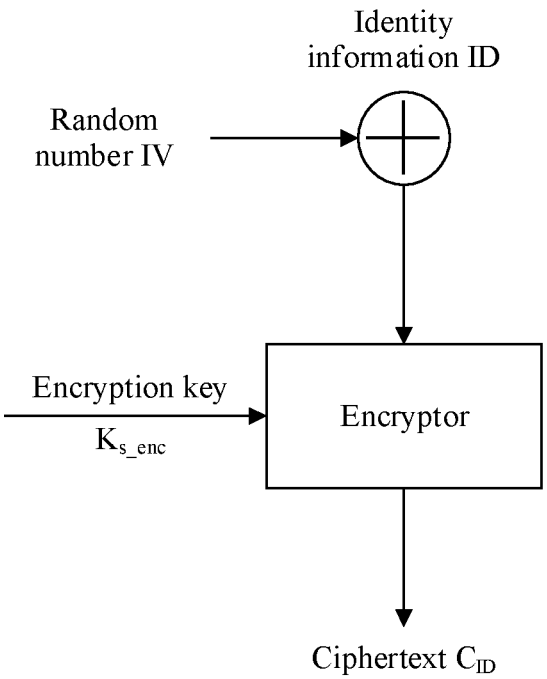
FIG. 7 is a schematic diagram of a method for obtaining a ciphertext in an encryption manner similar to cipher block chaining according to an embodiment of this application.

FIG. 7 is a schematic diagram of a method for obtaining the ciphertext in the encryption manner similar to cipher block chaining according to an embodiment of this application. In FIG. 7, the identity management server inputs the encryption key $K_{s\_enc}$ and a result obtained through an exclusive OR operation on ID and IV to an encryptor, and the encryptor performs an encryption operation and outputs the ciphertext $C_{ID}$.

It should be noted that, if a length of the identity information is equal to a length of an output value of the encryption algorithm, the identity information does not need to be padded, and the exclusive OR operation is directly performed on the identity information and the random number. If a length of the identity information is less than a length of an output value of the encryption algorithm, the identity information needs to be padded, and the length of the identity information is padded to be the same as the length of the output value of the encryption algorithm, and then the exclusive OR operation is performed with the random number, which ensures correct encryption processing.

In another possible implementation, another encryption manner may be used in step 506 to obtain the ciphertext. In other words, step 506 may include encrypting the identity information in an encryption mode similar to cipher feedback (CFB) or output feedback (OFB) to obtain the ciphertext.

Figure 8:
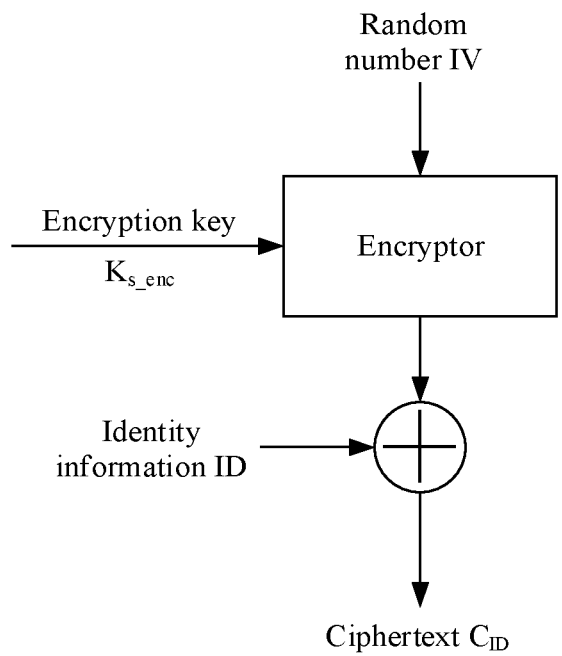
FIG. 8 is a schematic diagram of a method for obtaining a ciphertext in an encryption manner similar to cipher feedback or output feedback according to an embodiment of this application.

The foregoing encryption procedure may be represented using the following expression: $C_{ID}=E[K_{s\_enc}, IV]\ XOR\ ID$. FIG. 8 is a schematic diagram of a method for obtaining the ciphertext in the encryption manner similar to CFB or OFB according to an embodiment of this application. It can be seen in FIG. 8 that the identity management server inputs IV and the encryption key $K_{s\_enc}$ to an encryptor, and the encryptor performs an encryption operation, and performs an exclusive OR operation on ID and a result output by the encryptor to output the ciphertext $C_{ID}$.

It should be noted that, if a length of the identity information is equal to a length of an output value of the encryption algorithm, the exclusive OR operation is directly performed on the identity information and the result output by the encryptor. If a length of the identity information is less than a length of an output value of the encryption algorithm, a result output by the encryptor is intercepted to obtain an output value with a same length as the length of the identity information, and the exclusive OR operation is performed on the output value and the identity information, which can ensure correct encryption processing.

In the foregoing implementation process, a length of the random number may be equal to the length of the output value of the encryption algorithm, and the length of the identity information may be equal to or less than the length of the output value of the encryption algorithm. In addition, a specific encryption manner to be selected is not limited in this embodiment of this application.

It should be noted that, when the temporary privacy identity identifier includes the target quantity, the identity management server may generate random numbers of the target quantity, and then generate ciphertexts of the target quantity based on the random numbers of the target quantity such as to perform a subsequent procedure for generating the temporary privacy identity identifiers. In this way, the terminal device can be provided with a quantity of temporary privacy identity identifiers required by the terminal device. Certainly, temporary privacy identity identifiers generated by the identity management server for one terminal device may alternatively be of a default quantity configured by the server. This is not limited in this embodiment of this application.

Step 507: The identity management server obtains at least one feature code of the temporary privacy identity identifier based on the management domain identifier of the terminal device, the integrity authentication key, and the at least one ciphertext.

The identity management server may calculate the feature code of the temporary privacy identity identifier using the integrity authentication key $K_{s\_mac}$. A calculation manner may be represented using the following formula:

$$MAC=E[K_{s\_mac}, hash(Domain\ ID\|Key\ ID\|Protection\ Method\ ID\|C_{ID}\|IV\|Exp\ Time)].$$

hash( ) indicates a hash operation. E[ ] may indicate an encryption calculation. || may indicate concatenation. $K_{s\_mac}$ may indicate the encryption key for encryption calculation. Domain ID may indicate the management domain identifier of the terminal device. Key ID may indicate a number of the encryption key used by the identity management server. Protection Method ID may indicate a parameter such as an encryption algorithm and a key length. $C_{ID}$ may indicate the ciphertext of the identity information. Exp Time may indicate the validity period of the temporary privacy identity identifier.

It should be noted that the encryption key $K_{s\_mac}$ used for encryption calculation may also be used as the integrity authentication key.

Step 508: The identity management server generates at least one temporary privacy identity identifier based on the at least one feature code of the temporary privacy identity identifier.

In a possible implementation, the temporary privacy identity identifier may include a domain identifier of a domain to which the terminal device belongs, the ciphertext obtained by encrypting the identity information with the encryption key of the identity management server, and the random number. In other words, step 508 may include: the identity management server may concatenate the domain identifier of the domain to which the terminal device belongs, one ciphertext, and the corresponding random number, to obtain the temporary privacy identity identifier. When there is a plurality of generated ciphertexts, concatenation may be performed separately based on the foregoing procedure, to obtain a plurality of temporary privacy identity identifiers.

Optionally, the temporary privacy identity identifier may further include one or more of the number of the encryption key, encryption algorithm information, the key length of the encryption key, the validity period, and the feature code of the temporary privacy identity identifier. When the temporary privacy identity identifier includes more information, processing may also be performed based on the foregoing concatenation procedure. Details are not described herein again. In addition, specific content included in the temporary privacy identity identifier is not limited in this embodiment of this application. For example, the temporary privacy identity identifier may include the following content:

$$EID=Domain\ ID\|Key\ ID\|Protection\ Method\ ID\|C_{ID}\|IV\|Exp\ Time\|MAC$$

Step 509: The identity management server generates at least one authentication key corresponding to the at least one temporary privacy identity identifier based on a primary identity authentication key.

The primary identity authentication key may be an authentication key bound to the identity management server. The primary identity authentication key may have a validity period. When the validity period expires, the identity management server re-generates a primary identity authentication key, to ensure key security. The authentication key may be a credential used to prove an owner of the temporary privacy identity identifier.

Figure 9:
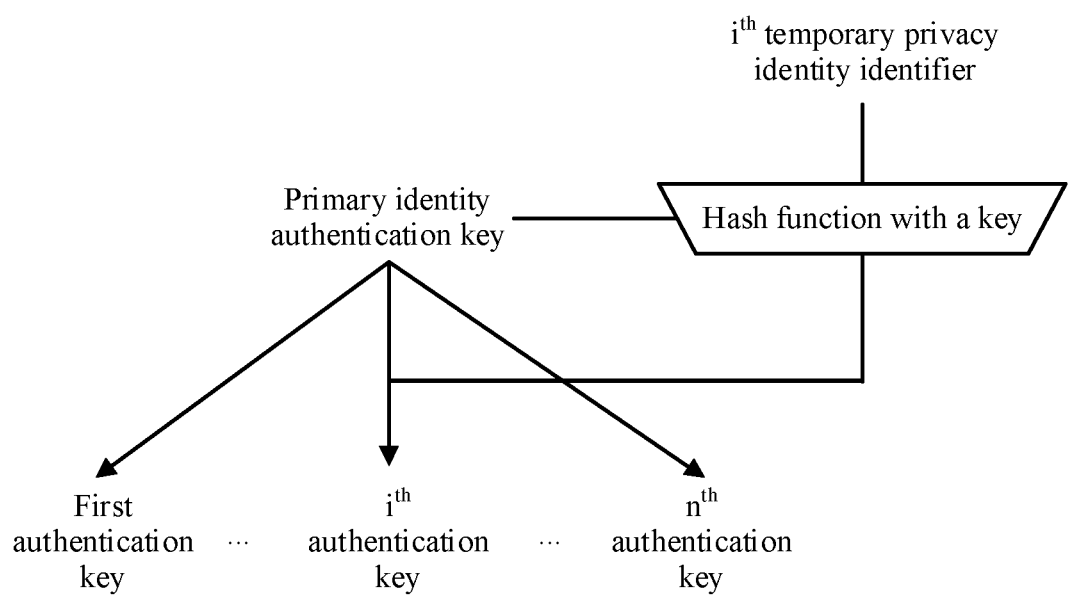
FIG. 9 is a schematic diagram of a method for generating an authentication key based on a temporary privacy identity identifier according to an embodiment of this application.

FIG. 9 is a schematic diagram of a method for generating the authentication key based on the temporary privacy identity identifier according to an embodiment of this application. In FIG. 9, the identity management server may perform an operation using a hash algorithm with a key based on the temporary privacy identity identifier, to generate the authentication key of the temporary privacy identity identifier.

For example, the operation manner may be represented using the following formula:

$$K_{EIDi}=H1(K_V, EIDi)$$

$K_{EIDi}$ is an authentication key of EIDi. EIDi may be an $i^{th}$ temporary privacy identity identifier. H1( ) may be the hash algorithm with the key, for example, an HMAC-SHA256 algorithm. $K_V$ may be the primary identity authentication key with the validity period.

It should be noted that the HMAC-SHA256 algorithm is a hash algorithm with a key, and another hash algorithm with a key may be selected. This is not limited in this embodiment of this application.

Step 510: The identity management server sends the at least one temporary privacy identity identifier and the at least one corresponding authentication key to the terminal device.

In a possible implementation, the identity management server may send the at least one temporary privacy identity identifier and the at least one corresponding authentication key to the terminal device through a secure channel. For example, the identity management server may perform encrypted distribution using the key shared by the identity management server and the terminal device, to further improve security.

Step 511: The terminal device receives the at least one temporary privacy identity identifier and the at least one corresponding authentication key that are returned by the identity management server.

It should be noted that after receiving the at least one temporary privacy identity identifier and the at least one corresponding authentication key that are returned by the identity management server, the terminal device stores the at least one temporary privacy identity identifier and the at least one corresponding authentication key for subsequent use.

It should be noted that the foregoing steps 501 to 511 provide a procedure for obtaining the temporary privacy identity identifier. The procedure is described only using an example in which it is not the first time to obtain the temporary privacy identity identifier. In some possible implementations, if the terminal device obtains a temporary privacy identity identifier for the first time, validity period detection may not be performed on the terminal device. Instead, the terminal device directly interacts with the identity management server based on a usage requirement, to obtain at least one temporary privacy identity identifier and at least one corresponding authentication key. A specific procedure thereof is similar to the foregoing procedure. This is not limited in this embodiment of this application.

In addition, it should be noted that steps 501 to 511 may be performed periodically, or may be performed when the terminal device has a network access requirement. For example, when the terminal device detects any network access instruction, steps 501 to 511 may be triggered such as to obtain at least one temporary privacy identity identifier and at least one corresponding authentication key.

Figure 10A:
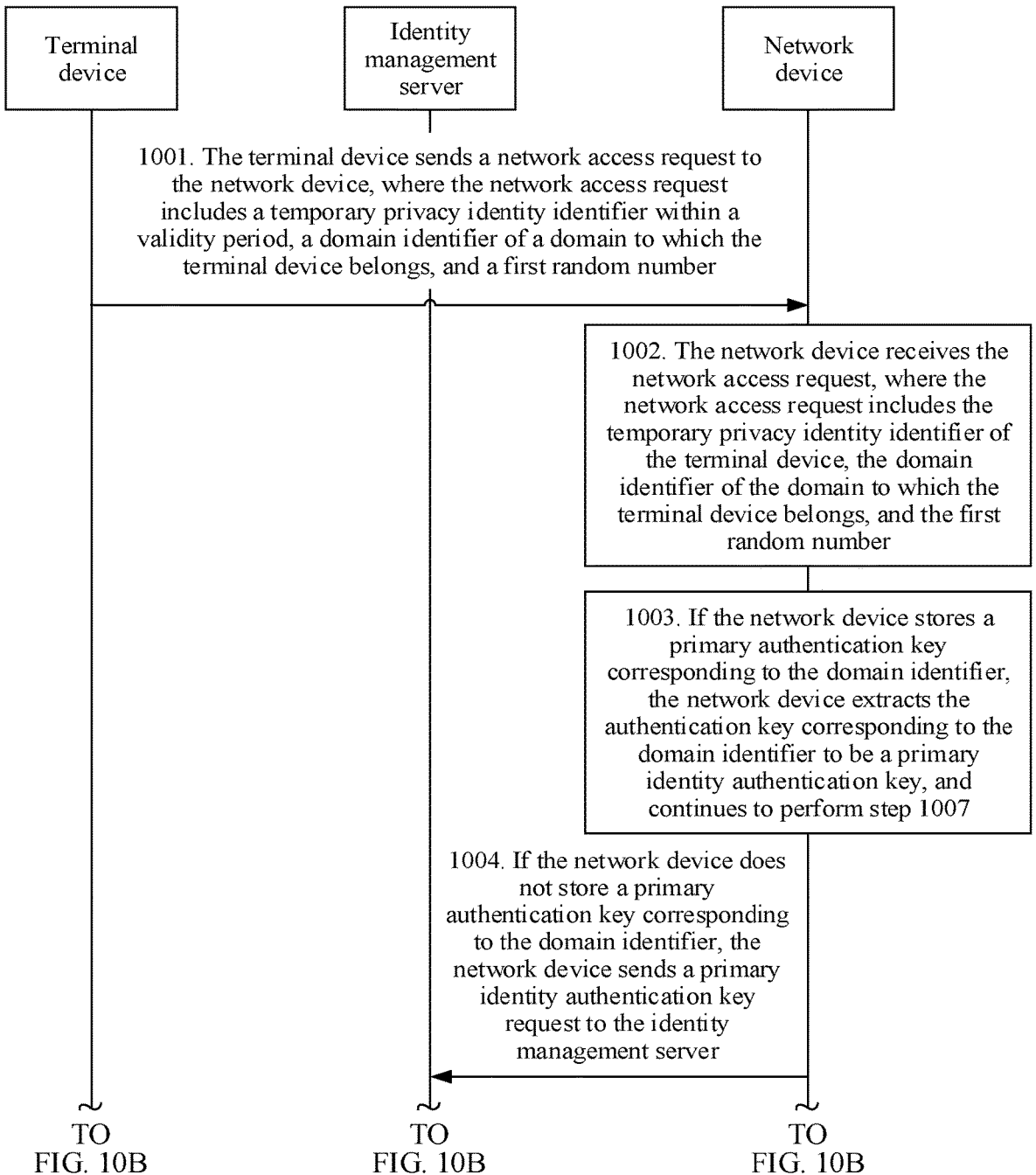
FIG. 10A to FIG. 10C are a flowchart of a mutual authentication method based on a temporary privacy identity identifier according to an embodiment of this application.
Figure 10B:
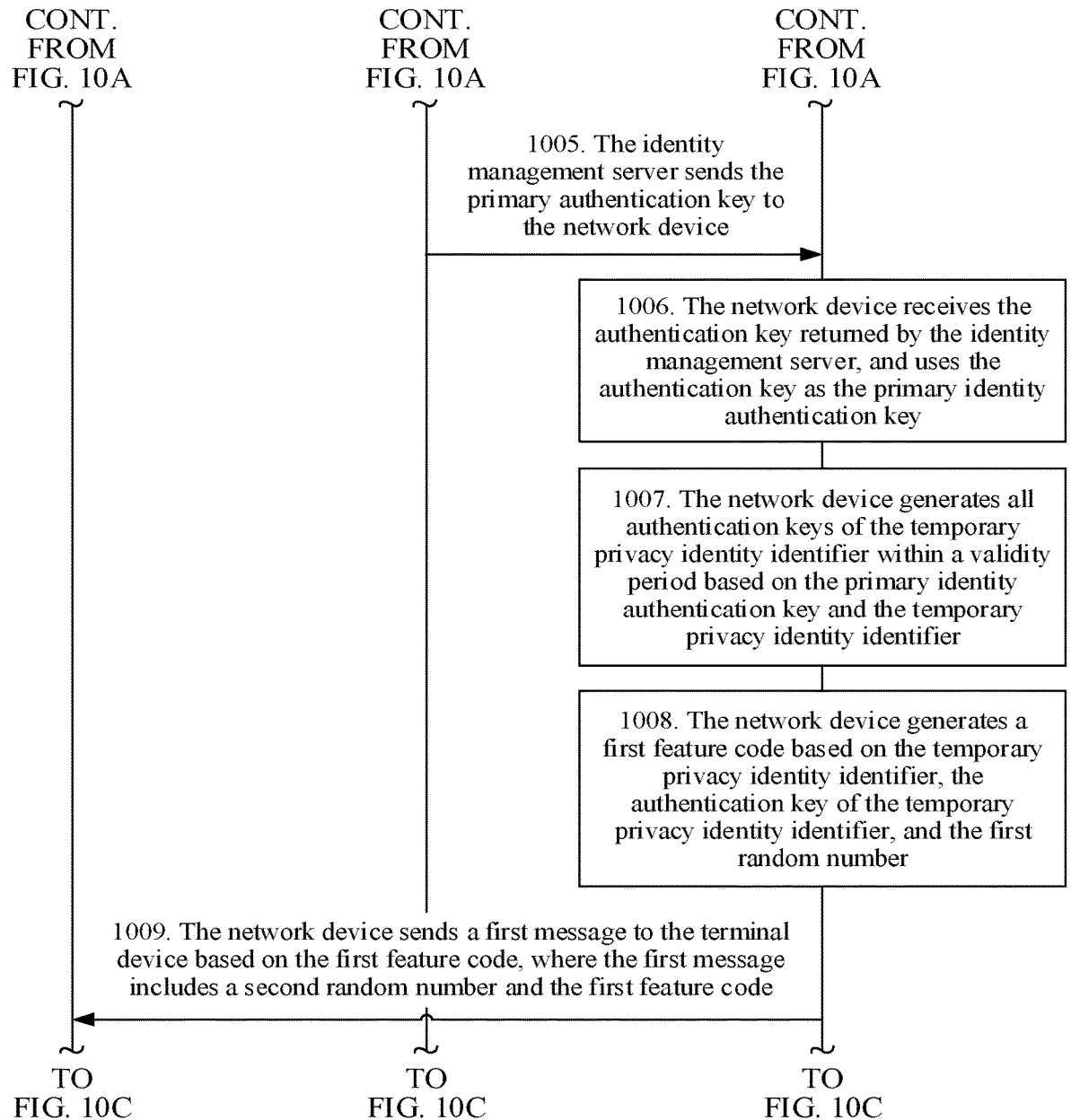
Figure 10C:
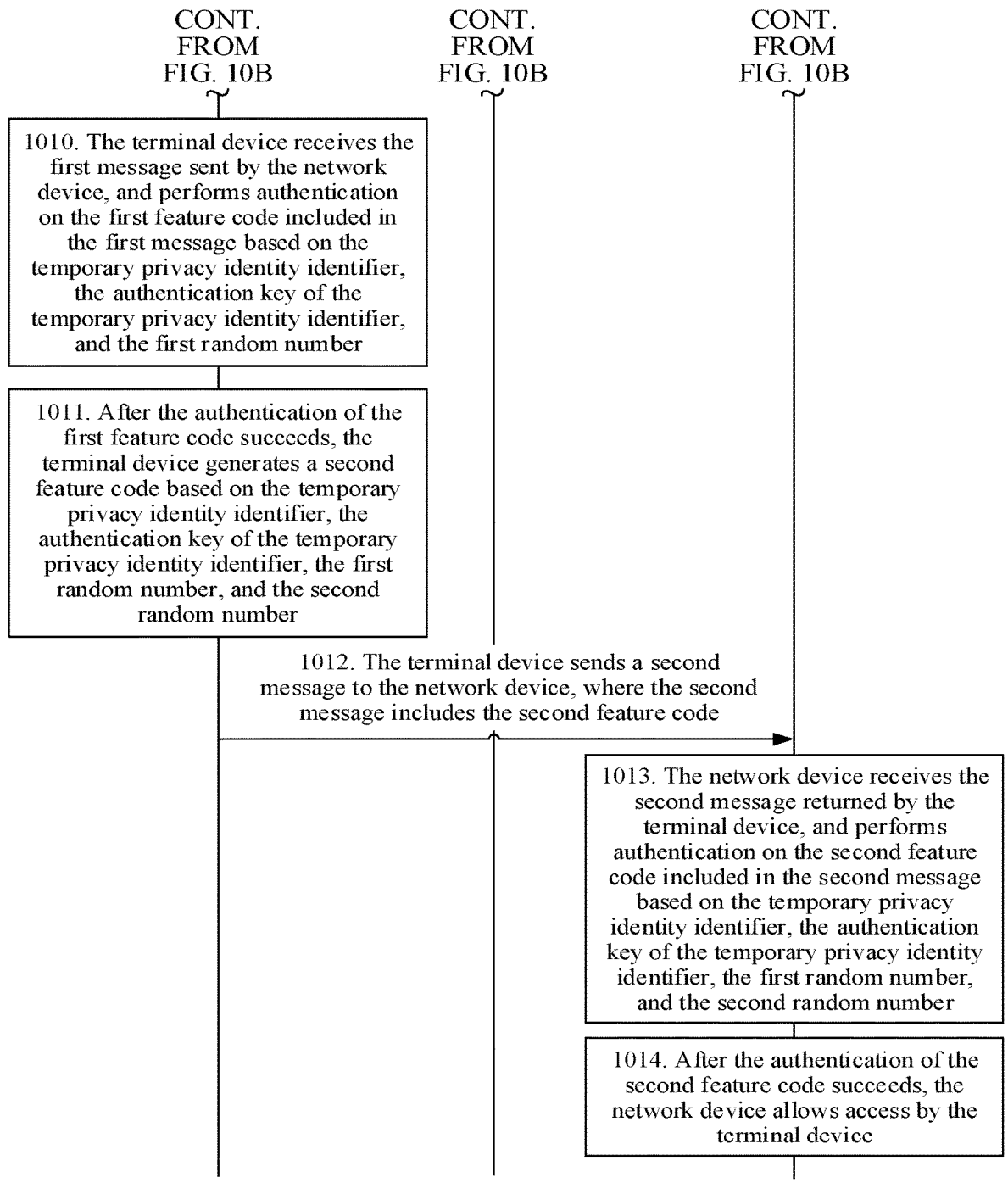

After obtaining at least one temporary privacy identity identifier and at least one corresponding authentication key, a terminal device may perform a mutual authentication procedure for network access based on the at least one temporary privacy identity identifier and the at least one corresponding authentication key that are obtained. The following specifically describes the mutual authentication procedure for network access using the embodiment shown in FIG. 10A to FIG. 10C. Refer to FIG. 10A to FIG. 10C. The method includes the following steps.

Step 1001. The terminal device sends a network access request to the network device. The network access request includes a temporary privacy identity identifier within a validity period, a domain identifier of a domain to which the terminal device belongs, and a first random number.

In a possible implementation, the terminal device may send the network access request to the network device through a secure channel. The network access request may include the temporary privacy identity identifier within the validity period and the first random number. The secure channel indicates that message interaction between the terminal device and the network device may be based on encrypted message interaction.

Certainly, it should be noted herein that the temporary privacy identity identifier carried in the network access request may be an unexpired temporary privacy identity identifier stored in the terminal, or may be a temporary privacy identity identifier re-obtained through an identity management server. This is not limited in this embodiment of this application.

Step 1002: The network device receives the network access request, where the network access request includes the temporary privacy identity identifier of the terminal device, the domain identifier of the domain to which the terminal device belongs, and the first random number.

Step 1003: If the network device stores a primary authentication key corresponding to the domain identifier, the network device extracts the authentication key corresponding to the domain identifier to be a primary identity authentication key, and continues to perform step 1007.

It should be noted that the network device may detect whether an authentication key corresponding to the domain identifier is stored. The authentication key corresponding to the domain identifier may be obtained by the network device in any previous authentication procedure, or may be pre-configured on the network device. If the primary authentication key corresponding to the domain identifier is already stored, the network device can directly use the locally stored primary authentication key such as to reduce signaling interaction.

Step 1004: If the network device does not store a primary authentication key corresponding to the domain identifier, the network device sends a primary identity authentication key request to an identity management server.

In a possible implementation, if the authentication key corresponding to the domain identifier is not stored on the network device, a corresponding identity management server may be determined based on the domain identifier, and the primary identity authentication key request is sent to the identity management server, to obtain the primary identity authentication key corresponding to the terminal device.

It should be noted that, in the foregoing procedure, an example in which the access network request carries the domain identifier is used for description. In some possible implementations, the access network request may alternatively not carry the domain identifier. Instead, the access network request belongs to a target management domain by default. In this case, a primary identity authentication key of the target management domain may be directly obtained for a subsequent processing procedure. This is not specifically limited in this embodiment of this application.

Step 1005: The identity management server sends the primary authentication key to the network device.

In a possible implementation, after receiving the primary identity authentication key request, the identity management server sends the primary authentication key of the identity management server to the network device through a secure channel. It should be noted that the primary authentication key may have a validity period. In other words, the identity management server may also periodically change the primary authentication key. Because the primary authentication key has the validity period, an authentication key derived from the primary authentication key also has a corresponding validity period. In this way, timeliness of authentication can be ensured, and user privacy protection can be further improved.

Step 1006: The network device receives the primary identity authentication key returned by the identity management server.

Step 1007: The network device generates an authentication key of the temporary privacy identity identifier within a validity period based on the primary identity authentication key and the temporary privacy identity identifier.

In a possible implementation, the network device performs derivation calculation based on the primary identity authentication key and the temporary privacy identity identifier to obtain the authentication key $K_{EID}$. It should be noted that the derivation calculation may be performed using a one-way function. For example, the one-way function may be a hash function with a key. In addition, through the foregoing derivation calculation procedure, a plurality of authentication keys may be obtained. FIG. 9 is a schematic diagram of an authentication key derivation method according to an embodiment of this application. Refer to FIG. 9, in this embodiment of this application, the network device may perform derivation calculation according to the following expression: $K_{EIDi}=H(K_V, EIDi)$. $H( )$ may be one hash algorithm with a key. $K_V$ may be the primary identity authentication key with the validity period. EIDi may be an $i^{th}$ temporary privacy identity identifier.

Step 1008: The network device generates a first feature code based on the temporary privacy identity identifier, the authentication key of the temporary privacy identity identifier, and the first random number.

In a possible implementation, the network device uses the temporary privacy identity identifier, the authentication key of the temporary privacy identity identifier, and the first random number as inputs of an encryption operation, to generate the first feature code. The encryption operation may be a hash operation with a key.

For example, the procedure for generating the first feature code may be represented as follows: $HMAC1=H[K_{EID}, EID, nonce1]$. $H[ ]$ may be a hash algorithm with a key. $K_{EID}$ may be the key of the hash algorithm with the key. EID may be the temporary privacy identity identifier. nonce1 may be the first random number.

Step 1009: The network device sends a first message to the terminal device based on the first feature code, where the first message includes a second random number and the first feature code.

In step 1009, the network device generates the first message carrying the second random number nonce2 and the first feature code HMAC1, and sends the first message as a response message to the terminal device.

It should be noted that first message content may also be used for generating the first feature code. To be specific, the first message content, the temporary privacy identity identifier, the authentication key of the temporary privacy identity identifier, and the first random number are used as inputs of the encryption operation to generate the first feature code. Further, in response to the inputs of the encryption operation, the network device may carry the first message content in the first message in step 1009 such that the terminal device performs identity authentication.

Step 1010: The terminal device receives the first message sent by the network device, and performs authentication on the first feature code included in the first message based on the temporary privacy identity identifier, the authentication key of the temporary privacy identity identifier, and the first random number.

In a possible implementation, the terminal device generates the first authentication code based on the temporary privacy identity identifier in the network access request, the authentication key of the temporary privacy identity identifier, and the received first random number, and performs authentication on the first feature code by comparing the first authentication code with the first feature code. When it is determined that the first authentication code and the first feature code are consistent, the authentication succeeds. When it is determined that the first authentication code and the first feature code are inconsistent, the authentication fails.

It should be noted that the first message content may also be used for generating the first authentication code. To be specific, the terminal device generates the first authentication code based on the temporary privacy identity identifier in the network access request, the authentication key of the temporary privacy identity identifier, the received first message content, and the first random number, and then performs the foregoing comparison procedure for authentication.

Step 1011: After the authentication of the first feature code succeeds, the terminal device generates a second feature code based on the temporary privacy identity identifier, the authentication key of the temporary privacy identity identifier, the first random number, and the second random number.

In a possible implementation, after the authentication of the first feature code succeeds, the terminal device uses the temporary privacy identity identifier, the authentication key of the temporary privacy identity identifier, the first random number, and the second random number as inputs of an encryption operation, to generate the second feature code. The encryption operation may be a hash operation with a key.

For example, the procedure for generating the second feature code may be represented as follows: HMAC2=H[$K_{EID}$,EID,nonce1,nonce2]. H[ ] may be a hash algorithm with a key. $K_{EID}$ may be the key of the hash algorithm with the key. EID may be the temporary privacy identity identifier. nonce1 may be the first random number. nonce2 may be the second random number.

Step 1012: The terminal device sends a second message to the network device, where the second message includes the second feature code.

In a possible implementation, the network device generates the second message that carries the second feature code HMAC2, and sends the second message as a response message to the terminal device.

In step 1009, the network device generates the first message carrying the second random number nonce2 and the first feature code HMAC1, and sends the first message as a response message to the terminal device.

It should be noted that second message content may also be used for generating the second feature code. To be specific, the second message content, the temporary privacy identity identifier, the authentication key of the temporary privacy identity identifier, the first random number, and the second random number are used as inputs of the encryption operation to generate the second feature code. Further, in response to the inputs of the encryption operation, the network device may carry the second message content in the second message in step 1012 such that the network device performs identity authentication on the terminal device.

Step 1013: The network device receives the second message returned by the terminal device, and performs authentication on the second feature code included in the second message based on the temporary privacy identity identifier, the authentication key of the temporary privacy identity identifier, the first random number, and the second random number.

In a possible implementation, the terminal device generates the second authentication code based on the temporary privacy identity identifier in the network access request, the locally derived authentication key of the temporary privacy identity identifier, the first random number, and the received second random number, and performs authentication on the second feature code by comparing the second authentication code with the second feature code. When it is determined that the second authentication code and the second feature code are consistent, the authentication succeeds. When it is determined that the second authentication code and the second feature code are inconsistent, the authentication fails.

It should be noted that the second message content carried in the second message may also be used for generating the second authentication code. To be specific, the terminal device generates the second authentication code based on the temporary privacy identity identifier in the network access request, the authentication key of the temporary privacy identity identifier, the received second message content, the first random number, and the second random number, and then performs the foregoing comparison procedure for authentication.

Step 1014: After the authentication of the second feature code succeeds, the network device allows access by the terminal device.

It should be noted that, if the second authentication code is the same as the second feature code, the authentication succeeds.

It should be noted that, when performing access and other services after access, the terminal device uses the temporary privacy identity identifier as a user identifier. Therefore, when a service processing procedure for an actual user, for example, auditing, needs to be performed, service data may be traced based on the temporary privacy identity identifier. An example of auditing is used. An audit server may obtain a decryption key of the temporary privacy identity identifier from the identity management server, and decrypt the temporary privacy identity identifier, to implement tracing and source tracing of a message.

In the foregoing solution, when the terminal device has a network access requirement, the terminal device sends a network access request carrying a temporary privacy identity identifier to a network device, and performs message interaction and authentication with the network device based on an authentication key corresponding to the temporary privacy identity identifier. In this way, an identity authentication procedure is completed, where authentication can be performed on a network, and identity authentication can be performed on the terminal device. This mutual authentication procedure based on the temporary privacy identity identifier greatly improves network access security. The network device can implement authentication on an anonymous identity of a user without maintaining an identity database, which can ensure that user privacy is not disclosed. In addition, in the identity authentication procedure, the network device can filter out a bogus request packet before an identity management server. In this way, processing pressure of the identity management server is greatly reduced, and occupation of a large quantity of processing resources is avoided such that processing of a normal request packet is not affected, and normal operation of the network service can be ensured.

Figure 11:
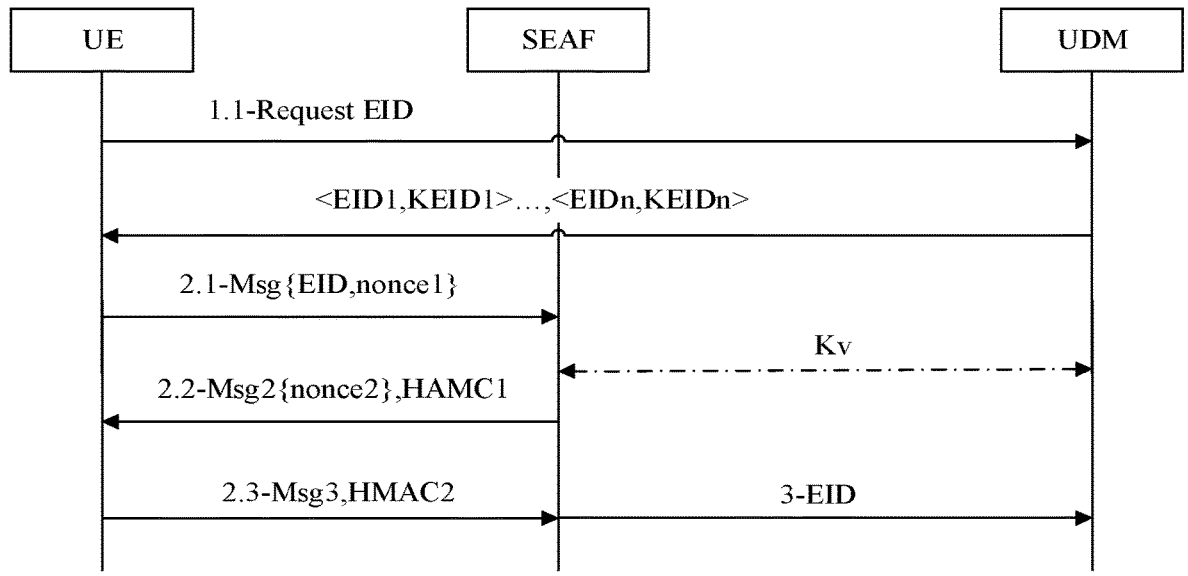
FIG. 11 is a schematic flowchart of an authentication procedure based on a temporary privacy identity identifier in 5G according to an embodiment of this application.

For comprehensive descriptions of the foregoing procedure, refer to the interaction flowchart provided in FIG. 11. It can be learned from the interaction example implemented in the 5G primary authentication procedure provided in FIG. 11. UE (a terminal device) may reach unified data management (UDM) (e.g., an identity management server) via security anchor unction (SEAF) and authentication server function (AUSF), to request a temporary privacy identity identifier. In response to the request in the foregoing requesting procedure, the UDM may generate one or more EIDs and authentication keys KEIDs, and send to the UE through a secure channel established by a secure connection.

When network access needs to be performed, the UE may use an EID within a validity period to replace a SUCI as a user identifier, and simultaneously send a random number nonce1. The SEAF generates an authentication key of the EID using the key derivation method provided in the embodiments of this application, and generates HMAC1 and a random number nonce2 as a response. The UE performs authentication on HMAC1. After the authentication succeeds, the UE generates HMAC2 and sends to the SEAF.

In this embodiment, the UDM may also serve as an audit server to obtain a decryption key corresponding to the temporary privacy identity identifier for decrypting a data stream, to implement auditing. For example, after authenticating a message carrying the EID, the SEAF forwards the message carrying the EID to the UDM. The UDM can decrypt and open the EID to obtain a SUPI for subsequent audit.

In the foregoing process, the EID is used to replace the current SUCI such that an air interface and a network access authenticator (a network element that implements a SEAF function) do not obtain the SUCI or the SUPI, and the air interface and the network access authenticator (a network element that implements a SEAF function) do not associate with a same device for a long time. Meanwhile, it is ensured that an identity manager UDM can identify the EID and open the EID to obtain the SUPI. The identity manager UDM can also serve as an auditor or implement an audit function at an independent audit server by securely sharing a decryption key of the EID.

The embodiments of this application are applicable to a scenario in which an untrusted node exists in internal network elements provided by a network service provider. When the terminal device needs to access a network via an incompletely trusted network element (a network element deployed close to a user side in distributed mode), the solutions provided in the embodiments of this application may be used. The foregoing embodiments of this application may be further applicable to a scenario in which the terminal device connects to a network via an access point deployed by an operator, or connects to a network via a wireless access point deployed by a large enterprise. Certainly, the embodiments of this application may be further applied to a communication network, for example, a 5G network. A function of the network access authenticator may be implemented by a base station. For example, in FIG. 11, the network device may be implemented by an access and mobility management function (AMF).

All the foregoing optional technical solutions may be randomly combined to form optional embodiments of this application, and details are not described herein.

Figure 12:
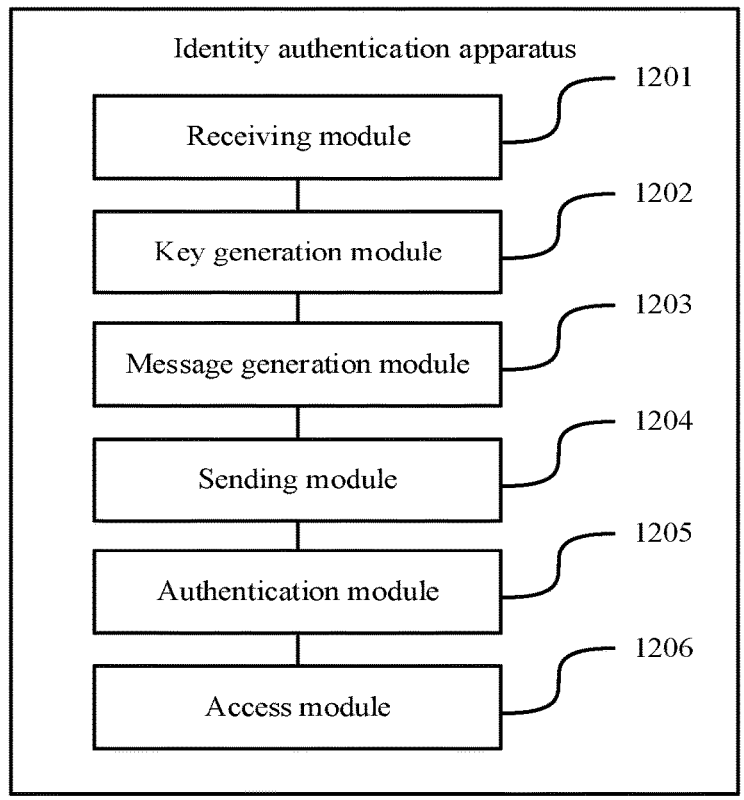
FIG. 12 is a schematic diagram of an identity authentication apparatus according to an embodiment of this application.

FIG. 12 is a schematic diagram of an identity authentication apparatus according to an embodiment of this application. Refer to FIG. 12, the apparatus includes a receiving module 1201 configured to perform step 1002, a key generation module 1202 configured to perform step 1007, a message generation module 1203 configured to perform the procedure for generating the first message in step 1008 and step 1009, a sending module 1204 configured to perform step 1009, where the receiving module 1201 is further configured to perform the procedure for receiving the second message returned by the terminal device in step 1013, an authentication module 1205, configured to perform the authentication procedure for the second feature code included in the second message in step 1013, and an access module 1206 configured to perform step 1014.

In a possible implementation, the apparatus further includes a derivation calculation module configured to perform step 1007.

In a possible implementation, the apparatus further includes an extracting module configured to perform step 1003, where the sending module is further configured to perform step 1004.

Figure 13:
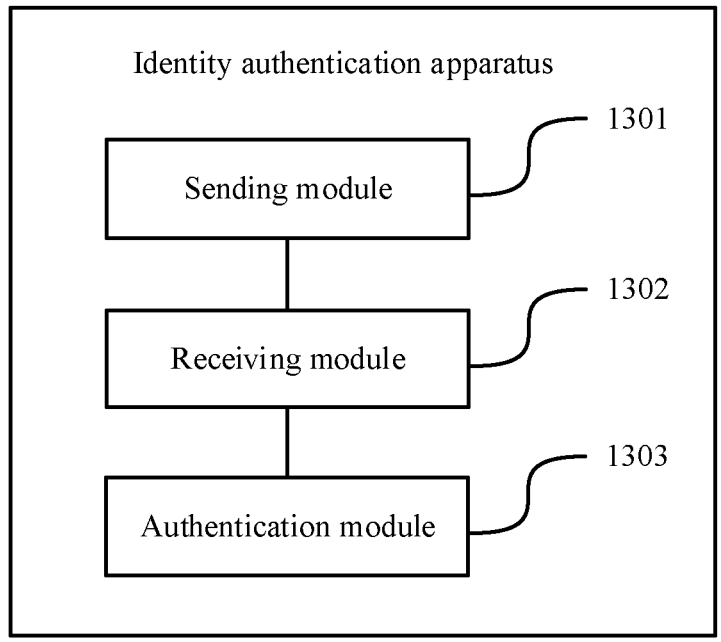
FIG. 13 is a schematic diagram of an identity authentication apparatus according to an embodiment of this application.

FIG. 13 is a schematic diagram of an identity authentication apparatus according to an embodiment of this application. Refer to FIG. 13, the apparatus includes a sending module 1301 configured to perform step 1001, where a receiving module 1302 configured to perform the procedure for receiving the first message sent by the network device in step 1010, and an authentication module 1303 configured to perform the authentication procedure for the first feature code included in the first message in step 1010, where the sending module 1301 is further configured to perform step 1012.

In a possible implementation, the apparatus further includes an authentication code generation module configured to perform step 1008, and a comparison module configured to perform the procedure for comparing the first authentication code and the first feature code in step 1010.

In a possible implementation, the sending module is further configured to perform step 503, and the receiving module is further configured to perform step 511.

In a possible implementation, the apparatus further includes a detection module configured to perform step 501.

Figure 14:
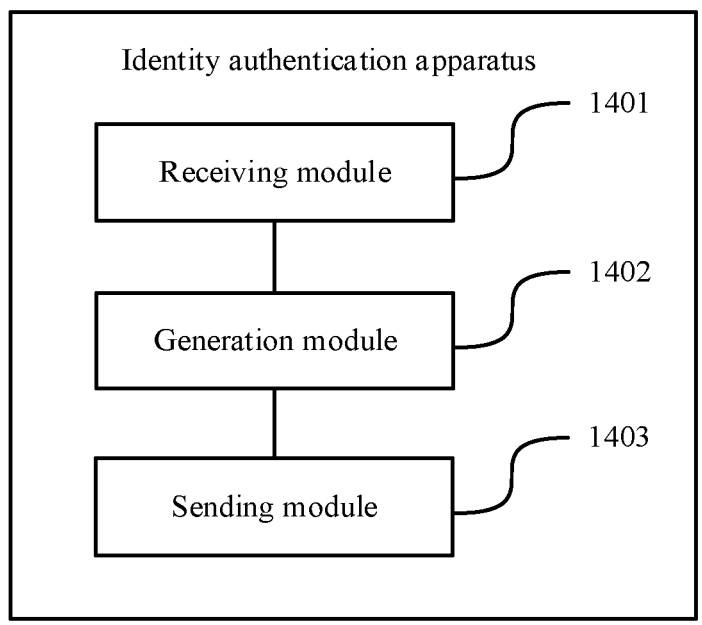
FIG. 14 is a schematic diagram of an identity authentication apparatus according to an embodiment of this application.

FIG. 14 is a schematic diagram of an identity authentication apparatus according to an embodiment of this application. Refer to FIG. 14, the apparatus includes a receiving module 1401 configured to perform step 504, a generation module 1402, configured to perform steps 508 and 509, and a sending module 1403 configured to perform step 510.

In a possible implementation, the third receiving module is further configured to perform the procedure for receiving the primary identity authentication key request in step 1005.

The sending module is further configured to perform the procedure for sending one authentication key of the authentication key corresponding to the generated at least one temporary privacy identity identifier to the network device in step 1005.

In a possible implementation, the apparatus further includes a private key obtaining module, configured to perform step 504, a key generation module configured to perform step 505, an encryption module configured to perform step 506, a feature code obtaining module, configured to perform step 507, and an identity identifier generation module configured to perform step 508, where the key generation module is further configured to perform step 509.

In a possible implementation, the apparatus further includes a selection module configured to perform the procedure for selecting one key from the generated keys as the private key in step 504, and a private key generation module configured to perform the procedure for generating a private key corresponding to the identity information according to the key generation policy in step 504.

It should be noted that, when the identity authentication apparatus provided in the foregoing embodiments triggers identity authentication, division of the functional modules is only used as an example for description. During actual application, the foregoing functions may be allocated to different functional modules for implementation as required. In other words, an internal structure of a device is divided into different functional modules to implement all or some of the foregoing functions. In addition, the identity authentication apparatus provided in the foregoing embodiments and the identity authentication method embodiments pertain to the same concept. For a detailed implementation process of the apparatus, refer to the method embodiments. Details are not described herein again.

In an example embodiment, a chip is further provided. The chip includes a processing circuit and an I/O interface that is internally connected to and communicated with the processing circuit. The processing circuit and the I/O interface are configured to implement corresponding steps according to the foregoing identity authentication method.

In an example embodiment, a chip is further provided. The chip includes one or more processors and one or more memories. The one or more memories store at least one instruction, and the instruction is loaded and executed by the one or more processors to implement operations performed in the foregoing identity authentication method.

In an example embodiment, a computer-readable storage medium is further provided, for example, a memory including instructions. The instructions may be executed by a processor to complete the identity authentication method in the foregoing embodiments. For example, the computer-readable storage medium may be a read-only memory (ROM), a random access memory (RAM), a compact disc (CD)-ROM, a magnetic tape, a floppy disk, an optical data storage device.

In an example embodiment, a computer program product including instructions is further provided. When the computer program product runs on a computer, the computer performs the method in the foregoing aspects.

A person of ordinary skill in the art may understand that all or some of the steps of the embodiments may be implemented using hardware or a program instructing related hardware. The program may be stored in a computer-readable storage medium, and the storage medium may include a read-only memory, a magnetic disk, or an optical disc.

The foregoing descriptions are only optional embodiments of this application, but are not intended to limit this application. Any modification, equivalent replacement, improvement, or the like made without departing from the spirit and principle of this application shall fall within the protection scope of this application.

What is claimed is:

1. A method comprising:
generating, by an identity management server and based on identity information of a user, a temporary privacy identity identifier of a terminal device;
receiving, from the terminal device, a network access request comprising the temporary privacy identity identifier;
generating a first authentication key of the temporary privacy identity identifier based on the temporary privacy identity identifier and a primary identity authentication key of a domain to which the terminal device belongs;
generating a first message based on the temporary privacy identity identifier and the first authentication key;
sending the first message to the terminal device;
receiving a second message from the terminal device based on the first message;
performing authentication on the second message based on the temporary privacy identity identifier and the first authentication key; and
allowing the terminal device to access a network device when the authentication succeeds.

2. The method of claim 1, wherein the network access request further comprises a domain identifier of the domain, and wherein after receiving the network access request, the method further comprises:
extracting a second authentication key corresponding to the domain identifier to be the primary identity authentication key when the network device stores the second authentication key; and
when the network device does not store the second authentication key,
sending a primary identity authentication key request to the identity management server; and
using, in response to the primary identity authentication key request, a third authentication key from the identity management server as the primary identity authentication key.

3. The method of claim 1, wherein generating the first authentication key comprises performing derivation calculation using a one-way function based on the primary identity authentication key and the temporary privacy identity identifier.

4. The method of claim 1, further comprising further receiving the network access request through a secure channel.

5. The method of claim 1, wherein the network access request further comprises a random number.

6. The method of claim 1, wherein the one-way function comprises a hash function with a key.

7. An apparatus comprising:
a receiver configured to receive, from a terminal device, a network access request comprising a temporary privacy identity identifier of the terminal device;
a key generator configured to generate a first authentication key of the temporary privacy identity identifier based on the temporary privacy identity identifier and a primary identity authentication key of a domain to which the terminal device belongs;
a message generator configured to generate a first message based on the temporary privacy identity identifier and the first authentication key;
a transmitter configured to send the first message to the terminal device, wherein the receiver is further configured to receive a second message from the terminal device based on the first message;

an authenticator configured to perform authentication on the second message based on the temporary privacy identity identifier and the authentication key; and an access system configured to allow the terminal device to access a network device when the authentication succeeds.

8. The apparatus of claim 7, wherein the network access request further comprises a domain identifier of the domain, and wherein the apparatus further comprises an extracting system configured to extract a second authentication key corresponding to the domain identifier to be the primary identity authentication key when the network device stores the second authentication key, and wherein the transmitter is further configured to send a primary identity authentication key request to an identity management server when the network device does not store the second authentication key.

9. The apparatus according to claim 7, wherein the key generator is further configured to perform derivation calculation using a one-way function based on the primary identity authentication key and the temporary privacy identity identifier to generate the first authentication key.

10. The apparatus of claim 7, wherein the receiver is further configured to further receive the network access request through a secure channel.

11. The apparatus of claim 7, wherein the network access request further comprises a random number.

12. The apparatus of claim 7, wherein the one-way function comprises a hash function with a key.

* * * * *